(12) United States Patent
Mahalingam

(10) Patent No.: US 6,223,234 B1
(45) Date of Patent: *Apr. 24, 2001

(54) APPARATUS FOR THE HOT SWAP AND ADD OF INPUT/OUTPUT PLATFORMS AND DEVICES

(75) Inventor: Mallikarjunan Mahalingam, Santa Clara, CA (US)

(73) Assignee: Micron Electronics, Inc., Nampa, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 09/118,219

(22) Filed: Jul. 17, 1998

(51) Int. Cl.[7] ....................................... G06F 13/00
(52) U.S. Cl. .......................... 710/103; 710/1; 710/8
(58) Field of Search ........................... 710/102–104, 710/126, 10, 128, 2, 72, 8, 1; 361/683, 686; 713/300, 2; 714/5; 709/253; 711/100

(56) References Cited

U.S. PATENT DOCUMENTS

| | | | |
|---|---|---|---|
| 4,057,847 | 11/1977 | Lowell et al. | 364/200 |
| 4,100,597 | 7/1978 | Fleming et al. | 364/474 |
| 4,449,182 | 5/1984 | Rubinson et al. | |
| 4,672,535 | 6/1987 | Katzman et al. | 364/200 |
| 4,692,918 | 9/1987 | Elliott et al. | 370/85 |
| 4,695,946 | 9/1987 | Andreasen et al. | 364/200 |
| 4,707,803 | 11/1987 | Anthony, Jr. et al. | |
| 4,769,764 | 9/1988 | Levanon | 364/708 |
| 4,774,502 | 9/1988 | Kimura | 340/501 |
| 4,821,180 | 4/1989 | Gerety et al. | 364/200 |
| 4,835,737 | 5/1989 | Herrig et al. | |
| 4,894,792 | 1/1990 | Mitchell et al. | 364/708 |
| 4,949,245 | 8/1990 | Martin et al. | |
| 4,999,787 | 3/1991 | McNally et al. | |
| 5,006,961 | 4/1991 | Monico | |
| 5,007,431 | 4/1991 | Donehoo, III | 128/696 |

(List continued on next page.)

FOREIGN PATENT DOCUMENTS

| | | | |
|---|---|---|---|
| 0 866 403 A1 | 9/1998 | (EP) | |
| 4-333118 | 11/1992 | (JP) | G06F/1/18 |
| 5-233110 | 9/1993 | (JP) | G06F/3/00 |
| 7-093064 | 4/1995 | (JP) | G06F/1/26 |
| 7-261874 | 10/1995 | (JP) | G06F/1/18 |

OTHER PUBLICATIONS

Shanley and Anderson, PCI System Architecture, Third Edition, Chapters 15 & 16, pp. 297–328, CR 1995.

PCI Hot–Plug Specification, Preliminary Revision for Review Only, Revision 0.9, pp. i–vi, and 1–25, Mar. 5, 1997.

SES SCSI–3 Enclosure Services, X3T10/Project 1212–D/Rev 8a, pp. i, iii–x, 1–76, and I–1 (index), Jan. 16, 1997.

Compaq Computer Corporation, Technology Brief, pp. 1–13, Dec. 1996, "Where Do I Plug the Cable? Solving the Logical–Physical Slot Numbering Problem."

Davis, T, Usenet post to alt.msdos.programmer, Apr. 1997, "Re: How do I create an FDISK batch file?"

(List continued on next page.)

Primary Examiner—Gopal C. Ray
(74) Attorney, Agent, or Firm—Knobbe, Martens, Olson & Bear, LLP

(57) ABSTRACT

A software architecture for the hot add and swap of $I_2O$ compliant input/output platform and adapters. The software architecture allows users to replace failed components, upgrade outdated components, and add new functionality, such as new network interfaces, disk interface adapters and storage, without impacting existing users. The software architecture supports the hot add and swap of off-the-shelf adapters, including those adapters that are programmable.

34 Claims, 15 Drawing Sheets

U.S. PATENT DOCUMENTS

| | | | |
|---|---|---|---|
| 5,033,048 | 7/1991 | Pierce et al. ............... | 371/21.2 |
| 5,051,720 | 9/1991 | Kittirutsunetorn ........... | 340/310 R |
| 5,073,932 | 12/1991 | Yossifer et al. ............. | 380/23 |
| 5,103,391 | 4/1992 | Barrett ..................... | 364/133 |
| 5,118,970 | 6/1992 | Olson et al. ................ | 307/443 |
| 5,121,500 | 6/1992 | Arlington et al. ............ | 395/750 |
| 5,123,017 | 6/1992 | Simpkins et al. ............. | 371/15.1 |
| 5,136,708 | 8/1992 | Lapourtre et al. ............ | 395/650 |
| 5,136,715 | 8/1992 | Hirose et al. ............... | 395/775 |
| 5,138,619 | 8/1992 | Fasang et al. ............... | 371/21.1 |
| 5,157,663 | 10/1992 | Major et al. ................ | 371/9.1 |
| 5,210,855 | 5/1993 | Bartol . | |
| 5,222,897 | 6/1993 | Collins et al. .............. | 439/157 |
| 5,245,615 | 9/1993 | Treu ........................ | 371/16.5 |
| 5,247,683 | 9/1993 | Holmes et al. ............... | 395/700 |
| 5,253,348 | 10/1993 | Scalise ..................... | 395/325 |
| 5,261,094 | 11/1993 | Everson et al. .............. | 395/600 |
| 5,265,098 | 11/1993 | Mattson et al. .............. | 371/11.1 |
| 5,266,838 | 11/1993 | Gerner ...................... | 307/19 |
| 5,269,011 | 12/1993 | Yanai et al. . | |
| 5,272,584 | 12/1993 | Austruy et al. . | |
| 5,273,382 | 12/1993 | Heald et al. ................ | 307/66 |
| 5,276,814 | 1/1994 | Bourke et al. ............... | 395/275 |
| 5,276,863 | 1/1994 | Heider ...................... | 395/575 |
| 5,277,615 | 1/1994 | Hastings et al. ............. | 439/377 |
| 5,280,621 | 1/1994 | Barnes et al. ............... | 395/800 |
| 5,283,905 | 2/1994 | Saadeh et al. ............... | 395/750 |
| 5,307,354 | 4/1994 | Cramer et al. . | |
| 5,311,397 | 5/1994 | Harshberger et al. .......... | 361/683 |
| 5,311,451 | 5/1994 | Barrett ..................... | 364/550 |
| 5,317,693 | 5/1994 | Cuenod et al. . | |
| 5,329,625 | 7/1994 | Kannan et al. . | |
| 5,337,413 | 8/1994 | Lui et al. . | |
| 5,351,276 | 9/1994 | Doll, Jr. et al. . | |
| 5,367,670 | 11/1994 | Ward et al. ................. | 395/575 |
| 5,379,184 | 1/1995 | Barraza et al. .............. | 361/685 |
| 5,379,409 | 1/1995 | Ishikawa .................... | 395/575 |
| 5,386,567 | 1/1995 | Lien et al. . | |
| 5,388,267 | 2/1995 | Chan et al. ................. | 395/700 |
| 5,402,431 | 3/1995 | Saadeh et al. ............... | 371/67.1 |
| 5,404,494 | 4/1995 | Garney . | |
| 5,423,025 | 6/1995 | Goldman et al. .............. | 395/575 |
| 5,430,717 | 7/1995 | Fowler et al. ............... | 370/58.2 |
| 5,430,845 | 7/1995 | Rimmer et al. ............... | 395/275 |
| 5,432,715 | 7/1995 | Shigematsu et al. ........... | 364/551.01 |
| 5,432,946 | 7/1995 | Allard et al. ............... | 395/750 |
| 5,438,678 | 8/1995 | Smith ....................... | 395/750 |
| 5,440,748 | 8/1995 | Sekine et al. . | |
| 5,448,723 | 9/1995 | Rowett ...................... | 395/200.02 |
| 5,455,933 | 10/1995 | Schieve et al. .............. | 395/183.03 |
| 5,460,441 | 10/1995 | Hastings et al. ............. | 312/298 |
| 5,463,766 | 10/1995 | Schieve et al. .............. | 395/650 |
| 5,465,349 | 11/1995 | Geronimi et al. ............. | 364/550 |
| 5,471,617 | 11/1995 | Farrand et al. .............. | 395/700 |
| 5,471,634 | 11/1995 | Giorgio et al. .............. | 395/600 |
| 5,473,499 | 12/1995 | Weir ........................ | 361/58 |
| 5,483,419 | 1/1996 | Kaczeus, Sr. et al. . | |
| 5,485,550 | 1/1996 | Dalton ...................... | 395/51 |
| 5,485,607 | 1/1996 | Lomet et al. ................ | 395/600 |
| 5,487,148 | 1/1996 | Komori et al. . | |
| 5,491,791 | 2/1996 | Glowny et al. . | |
| 5,493,574 | 2/1996 | McKinley . | |
| 5,493,666 | 2/1996 | Fitch . | |
| 5,513,314 | 4/1996 | Kandasamy et al. ............ | 395/182.04 |
| 5,513,339 | 4/1996 | Agrawal et al. .............. | 395/500 |
| 5,515,515 * | 5/1996 | Kennedy et al. . | |
| 5,517,646 | 5/1996 | Piccirillo et al. . | |
| 5,519,851 | 5/1996 | Bender et al. ............... | 395/500 |
| 5,526,289 | 6/1996 | Dinh et al. ................. | 364/557 |
| 5,528,409 | 6/1996 | Cucci et al. ................ | 359/171 |
| 5,530,810 | 6/1996 | Bowman ...................... | 395/283 |
| 5,533,193 | 7/1996 | Roscoe ...................... | 395/183.15 |
| 5,533,198 | 7/1996 | Thorson ..................... | 395/200.15 |
| 5,535,326 | 7/1996 | Baskey et al. ............... | 395/182.02 |
| 5,539,883 | 7/1996 | Allon et al. ................ | 395/200.11 |
| 5,542,055 | 7/1996 | Amini et al. ................ | 395/281 |
| 5,546,272 | 8/1996 | Moss et al. ................. | 361/687 |
| 5,548,712 | 8/1996 | Larson et al. ............... | 395/182.05 |
| 5,555,510 | 9/1996 | Verseput et al. . | |
| 5,559,764 | 9/1996 | Chen et al. ................. | 396/30 |
| 5,559,958 | 9/1996 | Farrand et al. .............. | 395/183.03 |
| 5,559,965 | 9/1996 | Oztaskin et al. . | |
| 5,560,022 | 9/1996 | Dunstan et al. .............. | 395/750 |
| 5,564,024 | 10/1996 | Pemberton . | |
| 5,566,299 | 10/1996 | Billings et al. ............. | 395/182.02 |
| 5,566,339 | 10/1996 | Perholtz et al. ............. | 395/750 |
| 5,568,610 | 10/1996 | Brown . | |
| 5,568,619 | 10/1996 | Blackledge et al. . | |
| 5,572,403 | 11/1996 | Mills ....................... | 361/695 |
| 5,577,205 | 11/1996 | Hwang et al. . | |
| 5,579,487 | 11/1996 | Meyerson et al. ............. | 395/280 |
| 5,579,491 | 11/1996 | Jeffries et al. . | |
| 5,579,528 | 11/1996 | Register .................... | 395/671 |
| 5,581,712 | 12/1996 | Herrman . | |
| 5,581,714 | 12/1996 | Amini et al. . | |
| 5,584,030 | 12/1996 | Husak et al. ................ | 395/750 |
| 5,586,250 | 12/1996 | Caronneau et al. ............ | 395/183.2 |
| 5,588,121 | 12/1996 | Reddin et al. ............... | 395/200.15 |
| 5,588,144 | 12/1996 | Inoue et al. . | |
| 5,592,610 | 1/1997 | Chittor ..................... | 395/182.02 |
| 5,592,611 | 1/1997 | Midgely et al. .............. | 395/182.02 |
| 5,596,711 | 1/1997 | Burckhartt et al. ........... | 395/182.21 |
| 5,598,407 | 1/1997 | Bud et al. .................. | 370/330 |
| 5,602,758 | 2/1997 | Lincoln et al. .............. | 364/505 |
| 5,604,873 | 2/1997 | Fite et al. ................. | 395/283 |
| 5,606,672 | 2/1997 | Wade . | |
| 5,608,865 | 3/1997 | Midgely et al. .............. | 395/180 |
| 5,608,876 | 3/1997 | Cohen et al. . | |
| 5,615,207 | 3/1997 | Gephardt et al. . | |
| 5,621,159 | 4/1997 | Brown et al. ................ | 73/9 |
| 5,621,892 | 4/1997 | Cook ........................ | 395/200.1 |
| 5,622,221 | 4/1997 | Genga, Jr. et al. ........... | 165/208 |
| 5,625,238 | 4/1997 | Ady et al. .................. | 307/147 |
| 5,627,962 | 5/1997 | Goodrum et al. .............. | 395/182.11 |
| 5,628,028 | 5/1997 | Michelson ................... | 395/825 |
| 5,630,076 | 5/1997 | Saulpaugh et al. ............ | 395/284 |
| 5,631,847 | 5/1997 | Kikinis ..................... | 364/514 R |
| 5,632,021 | 5/1997 | Jennings et al. . | |
| 5,636,341 | 6/1997 | Matsushita et al. ........... | 395/182.11 |
| 5,638,289 | 6/1997 | Yamada et al. . | |
| 5,644,470 | 7/1997 | Benedict et al. . | |
| 5,644,731 | 7/1997 | Liencres et al. . | |
| 5,651,006 | 7/1997 | Fujino et al. . | |
| 5,652,832 | 7/1997 | Kane et al. . | |
| 5,652,833 | 7/1997 | Takizawa et al. ............. | 395/182.08 |
| 5,652,839 | 7/1997 | Giorgio et al. .............. | 395/200.11 |
| 5,652,892 | 7/1997 | Ugajin ...................... | 395/750 |
| 5,652,908 | 7/1997 | Douglas et al. .............. | 395/800 |
| 5,655,081 | 8/1997 | Bonnell et al. . | |
| 5,655,083 | 8/1997 | Bagley ...................... | 395/182.31 |
| 5,655,148 | 8/1997 | Richman et al. . | |
| 5,659,682 | 8/1997 | Devarakonda et al. . | |
| 5,664,118 | 9/1997 | Nishigaki et al. ............ | 395/283 |
| 5,664,119 | 9/1997 | Jeffries et al. . | |
| 5,666,538 | 9/1997 | DeNicola . | |
| 5,668,943 | 9/1997 | Attanasio et al. ............ | 395/182.05 |
| 5,668,992 | 9/1997 | Hammer et al. ............... | 395/651 |
| 5,669,009 | 9/1997 | Buktenica et al. ............ | 395/800.35 |
| 5,671,371 | 9/1997 | Kondo et al. ................ | 395/306 |
| 5,675,723 | 10/1997 | Ekrot et al. . | |
| 5,680,288 | 10/1997 | Carey et al. . | |

| | | | | | | |
|---|---|---|---|---|---|---|
| 5,682,328 | 10/1997 | Roeber et al. ............... 364/550 | | 5,799,036 | 8/1998 | Staples . |
| 5,684,671 | 11/1997 | Hobbs et al. . | | 5,799,196 | 8/1998 | Flannery ............... 395/750.03 |
| 5,689,637 | 11/1997 | Johnson et al. . | | 5,801,921 | 9/1998 | Miller . |
| 5,696,895 | 12/1997 | Hemphill et al. ........... 395/182.02 | | 5,802,269 | 9/1998 | Poisner et al. . |
| 5,696,899 | 12/1997 | Kalwitz . | | 5,802,298 | 9/1998 | Imai et al. ............... 395/200.47 |
| 5,696,949 | 12/1997 | Young ...................... 395/551 | | 5,802,305 | 9/1998 | McKaughan et al. .......... 395/200.57 |
| 5,696,970 | 12/1997 | Sandage et al. . | | 5,802,324 | 9/1998 | Wunderlich et al. ............. 395/281 |
| 5,701,417 | 12/1997 | Lewis et al. ............... 395/200.16 | | 5,802,393 | 9/1998 | Begun et al. . |
| 5,704,031 | 12/1997 | Mikami et al. ............... 395/182.02 | | 5,802,552 | 9/1998 | Fandrich et al. . |
| 5,708,775 | 1/1998 | Nakamura .................... 395/185.01 | | 5,802,592 | 9/1998 | Chess et al. ............... 711/164 |
| 5,708,776 | 1/1998 | Kikinis ..................... 395/185.08 | | 5,803,357 | 9/1998 | Lakin ............... 236/78 B |
| 5,712,754 | 1/1998 | Sides et al. ............... 361/58 | | 5,805,804 | 9/1998 | Laursen et al. ............... 395/200.02 |
| 5,715,456 | 2/1998 | Bennett et al. ............... 395/652 | | 5,805,834 | 9/1998 | McKinley et al. . |
| 5,717,570 | 2/1998 | Kikinis ..................... 361/685 | | 5,809,224 | 9/1998 | Schultz et al. . |
| 5,721,935 | 2/1998 | DeSchepper et al. ............... 395/750 | | 5,809,256 | 9/1998 | Najemy ............... 395/283 |
| 5,724,529 | 3/1998 | Smith et al. . | | 5,809,287 | 9/1998 | Stupek, Jr. et al. ............... 395/500 |
| 5,726,506 | 3/1998 | Wood . | | 5,809,311 | 9/1998 | Jones ............... 395/750.01 |
| 5,727,207 | 3/1998 | Gates et al. ............... 395/651 | | 5,809,555 | 9/1998 | Hobson ............... 711/172 |
| 5,732,266 | 3/1998 | Moore et al. ............... 395/651 | | 5,812,748 | 9/1998 | Ohran et al. ............... 395/182.02 |
| 5,737,708 | 4/1998 | Grob et al. ............... 455/557 | | 5,812,750 | 9/1998 | Dev et al. . |
| 5,737,747 | 4/1998 | Vishlitzky et al. ............... 711/118 | | 5,812,757 | 9/1998 | Okamoto et al. . |
| 5,740,378 | 4/1998 | Rehl et al. . | | 5,812,858 | 9/1998 | Nookala et al. . |
| 5,742,514 | 4/1998 | Bonola ..................... 364/492 | | 5,815,117 | 9/1998 | Kolanek . |
| 5,742,833 | 4/1998 | Dea et al. ............... 395/750.05 | | 5,815,647 | 9/1998 | Buckland et al. ............... 395/182.01 |
| 5,747,889 | 5/1998 | Raynham et al. . | | 5,815,651 | 9/1998 | Litt ............... 395/182.08 |
| 5,748,426 | 5/1998 | Bedingfield et al. . | | 5,815,652 | 9/1998 | Ote et al. . |
| 5,752,164 | 5/1998 | Jones ..................... 455/33.1 | | 5,821,596 | 10/1998 | Miu et al. ............... 257/419 |
| 5,754,396 | 5/1998 | Felcman et al. ............... 361/683 | | 5,822,547 | 10/1998 | Boesch et al. . |
| 5,754,449 | 5/1998 | Hoshal et al. ............... 364/550 | | 5,826,043 | 10/1998 | Smith et al. . |
| 5,754,797 | 5/1998 | Takahashi . | | 5,829,046 | 10/1998 | Tzelnic et al. ............... 711/162 |
| 5,758,165 | 5/1998 | Shuff ............... 395/712 | | 5,835,719 | 11/1998 | Gibson et al. ............... 395/200.51 |
| 5,758,352 | 5/1998 | Reynolds et al. ............... 707/200 | | 5,835,738 | 11/1998 | Blackledge, Jr. et al. . |
| 5,761,033 | 6/1998 | Wilhelm . | | 5,838,932 | 11/1998 | Alzien ............... 395/308 |
| 5,761,045 | 6/1998 | Olson et al. . | | 5,841,964 | 11/1998 | Yamaguchi ............... 395/113.21 |
| 5,761,085 | 6/1998 | Giorgio ............... 364/505 | | 5,841,991 | 11/1998 | Russell . |
| 5,761,462 | 6/1998 | Neal et al. . | | 5,845,061 | 12/1998 | Miyamoto et al. ............... 395/182.02 |
| 5,761,707 | 6/1998 | Aiken et al. ............... 711/118 | | 5,845,095 | 12/1998 | Reed et al. ............... 395/283 |
| 5,764,924 | 6/1998 | Hong ............... 395/281 | | 5,850,546 | 12/1998 | Kim ............... 395/651 |
| 5,764,968 | 6/1998 | Ninomiya . | | 5,852,720 | 12/1998 | Gready et al. . |
| 5,765,008 | 6/1998 | Desai et al. . | | 5,852,724 | 12/1998 | Glenn, II et al. ............... 395/200.69 |
| 5,765,198 | 6/1998 | McCrocklin et al. . | | 5,857,074 | 1/1999 | Johnson . |
| 5,767,844 | 6/1998 | Stoye ............... 345/212 | | 5,857,102 | 1/1999 | McChesney et al. ............... 395/653 |
| 5,768,541 | 6/1998 | Pan-Ratzlaff . | | 5,864,653 | 1/1999 | Tavallaei et al. ............... 315/181 |
| 5,768,542 | 6/1998 | Enstrom et al. . | | 5,864,654 | 1/1999 | Marchant ............... 395/182.01 |
| 5,771,343 | 6/1998 | Hafner et al. ............... 395/182.02 | | 5,864,713 | 1/1999 | Terry ............... 395/872 |
| 5,774,640 | 6/1998 | Kurio ............... 395/182.02 | | 5,867,730 | 2/1999 | Leyda ............... 395/830 |
| 5,774,645 | 6/1998 | Beaujard et al. ............... 395/183.01 | | 5,875,307 | 2/1999 | Ma et al. ............... 395/281 |
| 5,774,741 | 6/1998 | Choi . | | 5,875,308 | 2/1999 | Egan et al. ............... 395/283 |
| 5,777,897 | 7/1998 | Giorgio ............... 364/557 | | 5,875,310 | 2/1999 | Buckland et al. ............... 395/306 |
| 5,778,197 | 7/1998 | Dunham ............... 395/284 | | 5,878,237 | 3/1999 | Olarig ............... 395/308 |
| 5,781,703 | 7/1998 | Desai et al. . | | 5,878,238 | 3/1999 | Gan et al. ............... 395/308 |
| 5,781,716 | 7/1998 | Hemphill et al. ............... 395/182.02 | | 5,881,311 | 3/1999 | Woods ............... 395/824 |
| 5,781,744 | 7/1998 | Johnson et al. ............... 395/283 | | 5,884,027 | 3/1999 | Garbus et al. ............... 395/200.8 |
| 5,781,767 | 7/1998 | Inoue et al. . | | 5,884,049 | 3/1999 | Atkinson ............... 395/281 |
| 5,781,798 | 7/1998 | Beatty et al. . | | 5,886,424 | 3/1999 | Kim ............... 307/64 |
| 5,784,555 | 7/1998 | Stone ............... 395/200.5 | | 5,889,965 | 3/1999 | Wallach et al. ............... 395/283 |
| 5,784,576 | 7/1998 | Guthrie et al. . | | 5,892,898 | 4/1999 | Fujii et al. ............... 395/185.1 |
| 5,787,019 | 7/1998 | Knight et al. ............... 364/550 | | 5,892,915 | 4/1999 | Duso et al. ............... 395/200.49 |
| 5,787,023 | 8/1998 | Berman et al. ............... 395/750.06 | | 5,892,928 | 4/1999 | Wallach et al. ............... 395/283 |
| 5,787,459 | 7/1998 | Stallmo et al. ............... 711/112 | | 5,893,140 | 4/1999 | Vahalia et al. ............... 711/118 |
| 5,787,491 | 7/1998 | Merkin et al. ............... 711/173 | | 5,898,846 | 4/1999 | Kelly ............... 395/284 |
| 5,790,775 | 8/1998 | Marks et al. ............... 395/182.07 | | 5,898,888 | 4/1999 | Guthrie et al. ............... 395/308 |
| 5,790,831 | 8/1998 | Lin et al. . | | 5,905,867 | 5/1999 | Giorgio ............... 395/200.54 |
| 5,793,948 | 8/1998 | Asahi et al. ............... 395/184.01 | | 5,907,672 | 5/1999 | Matze et al. ............... 395/182.06 |
| 5,793,987 | 8/1998 | Quackenbush et al. . | | 5,909,568 | 6/1999 | Nason ............... 395/500 |
| 5,794,035 | 8/1998 | Golub et al. . | | 5,911,779 | 6/1999 | Stallmo et al. ............... 714/6 |
| 5,796,185 | 8/1998 | Takata et al. . | | 5,913,034 | 6/1999 | Malcolm ............... 395/200.53 |
| 5,796,580 | 8/1998 | Komatsu et al. ............... 361/687 | | 5,922,060 | 7/1999 | Goodrum ............... 710/103 |
| 5,796,934 | 8/1998 | Bhanot et al. ............... 395/182.02 | | 5,930,358 | 7/1999 | Rao ............... 380/4 |
| 5,796,981 | 8/1998 | Abudayyeh et al. . | | 5,935,262 | 8/1999 | Barrett et al. ............... 714/46 |
| 5,798,828 | 8/1998 | Thomas et al. . | | 5,936,960 | 8/1999 | Stewart ............... 370/438 |

| | | | |
|---|---|---|---|
| 5,938,751 | 8/1999 | Tavallaei et al. | 710/103 |
| 5,941,996 | 8/1999 | Smith et al. | 714/47 |
| 5,964,855 | 10/1999 | Bass et al. | 710/103 |
| 5,983,349 | 11/1999 | Kodama et al. | 713/200 |
| 5,987,554 | 11/1999 | Liu et al. | 710/129 |
| 5,987,621 | 11/1999 | Duso et al. | 714/4 |
| 5,987,627 | 11/1999 | Rawlings, III | 714/48 |
| 6,012,130 | 1/2000 | Beyda et al. | 711/173 |
| 6,038,624 * | 3/2000 | Chan et al. . | |

OTHER PUBLICATIONS

Davis, T., Usenet post to alt.msdos.batch, Apr. 1997, "Re: Need help with automating FDISK and FORMAT . . . ".

NetFrame Systems Incorporated, Doc. No. 78–1000226–01, pp. 1–2, 5–8, 359–404, and 471–512, Apr. 1986, "NetFrame Clustered Multiprocessing Software; NW0496 DC–ROM for Novell® NetWare® 4.1 SMP, 4.1, and 3.12."

Shanley, and Anderson, PCI System Architecture, Third Edition, Chapter 15, pp. 297–302, Copyright 1995, "Intro To Configuration Address Space."

Shanley, and Anderson, PCI System Architecture, Third Edition, Chapter 16, pp. 303–328, Copyright 1995, "Configuration Transactions."

Sun Microsystems Computer Company, Part No. 802–5355–10, Rev. A, May 1996, "Solstice SyMON User's Guid."

Sun Microsystems, Part No. 802–6569–11, Release 1.0.1, Nov. 1996, "Remote Systems Diagnostics Installation & User Guide."

Gorlick, M., Conf. Proceedings; ACM/ONR Workshop on Parallel and Distributed Debugging, pp. 175–181, 1991, "The Flight Recorder: An Architectural Aid for System Monitoring."

IBM Technical Disclosure Bulletin, 92A+62947, pp. 391–394, Oct. 1992, Method for Card Hot Plug Detection and Control.

Lyons, Computer Reseller News, Issue 721, pp. 61–62, Feb. 3, 1997, "ACC Releases Low–Cost Solution for ISPs."

M2 Communications, M2 Presswire, 2 pages, Dec. 19, 1996, "Novell IntranetWare Supports Hot Pluggable PCI from NeFRAME."

Rigney, PC Magazine, 14(17): 375–379, Oct. 10, 1995, "The One for the Road (Mobile–aware capabilities in Windows 95)."

Shanley, and Anderson, PCI Systems Architecture, Third Edition, p. 382, Copyright 1995, ftp.cdrom.com/pub/Os2/diskutil/, PHDX software, phdx.zip download, Mar. 1995, "Parallel Hard Disk Xfer."

Cmasters, Usenet post to microsoft.public.windowsnt.setup, Aug. 1997, "Re: FDISK switches."

Hildebrand, N., Usenet post to comp.msdos.programmer, May 1995, "Re: Structure of disk partition into."

Lewis, L., Usenet post to alt.msdos.batch, Apr. 1997, "Re: Need help with automating FDISK and FORMAT."

Netframe, http://www.netframe–support.com/technology/datasheets/data.htm, before Mar. 1997, "Netframe Cluster-System 9008 Data Sheet."

Simos, M., Usenet post to comp.os.msdos.misc, Apr. 1997, "Re: Auto FDISK and FORMAT."

Wood, M. H., Usenet post to comp.os.netware.misc, Aug. 1996, "Re: Workstation duplication method for WIN95."

Compaq Computer Corporation, Phenix Technologies, LTD, and Intel Corporation, *specification*, 55 pages, May 5, 1994, "Plug & Play BIOS Specification."

Digital Equipment Corporation, *datasheet*, 140 pages, 1993, "DECchip 21050 PCI–TO–PCI Bridge."

Herr et al., *Linear Technology Magazine*, Jun. 1997, "Hot Swapping the PCI Bus."

Joint work by Intel Corporation, Compaq, Adaptec, Hewlett Packard, and Novell, *presentation*, 22 pages, Jun. 1996, "Intelligent I/O Architecture."

Lockareff, M., HTINews, http://www.hometoys.com/htinews/dec96/articles/Ionworks.htm, Dec. 1996, "Loneworks—An Introduction."

Microsoft Corporation, file:///A|/Rem__devs.htm, 4 pages, Copyright 1997, updated Aug. 13, 1997, "Supporting Removable Devices Under Windows and Windows NT."

NetFRAME Systems Incorporated, *datasheet*, Mar. 1996, "NetFRAME Cluster Server 8000."

NetFRAME Systems Incorporated, *News Release*, 3 pages, referring to May 9, 1994, "NetFRAME's New High–Availability ClusterServer Systems Avoid Scheduled as well as Unscheduled Downtime."

NetFRAME Systems Incorporated, *datasheet*, Feb. 1996, "NF450FT Network Mainframe."

NTRR, Ltd, http://www.nrtt.demon.co.uk/cantech.html, 5 pages, May 28, 1997, "CAN: Technical Overview."

PCI Special Interest Group, *specification*, 35 pages, Draft For Review Only, Jun. 15, 1997, "PCI Bus Hot Plug Specification."

Schofield, M.J., http://www.omegas.co.uk/CAN/canworks.htm, Copyright 1996, 1997, "Controller Area Network—How CAN Works."

Standards Overview, http://www.pc–card.com/stand__overview.html#1, 9 pages, Jun. 1990, "Detailed Overview of the PC Card Standard."

Haban, D. & D. Wybranietz, *IEEE Transaction on Software Engineering*, 16(2):197–211, Feb. 1990, "A Hybrid Monitor for Behavior and Performance Analysis of Distributed Systems."

* cited by examiner

APPARATUS FOR THE HOT SWAP AND ADD OF INPUT/OUTPUT PLATFORMS AND DEVICES

RELATED APPLICATIONS

The subject matter of the U.S. Patent Application entitled "METHOD FOR THE HOT SWAP AND ADD OF INPUT/OUTPUT PLATFORMS AND DEVICES," filed concurrently herewith, Application Ser. No. 09/118,716, contains related subject matter. In addition, this is a continuation-in-part of and incorporates by reference in their entirety the below listed U.S. patents and patent applications:

| Attorney Docket No. | Ser. No. or Patent No. | Filing Date | Title |
|---|---|---|---|
| MNFRAME.006A1 | 08/942,309 | 10/01/97 | HOT ADD OF DEVICES SOFTWARE ARCHITECTURE |
| MNFRAME.006A2 | 08/942,306 | 10/01/97 | METHOD FOR THE HOT ADD OF DEVICES |
| MNFRAME.006A3 | 08/942,311 | 10/01/97 | HOT SWAP OF DEVICES SOFTWARE ARCHITECTURE |
| MNFRAME.006A4 | 08/942,457 | 10/01/97 | METHOD FOR THE HOT SWAP OF DEVICES |
| MNFRAME.006A5 | 5,892,928 | 10/01/97 | METHOD FOR THE HOT ADD OF A NETWORK ADAPTER ON A SYSTEM INCLUDING A DYNAMICALLY LOADED ADAPTER DRIVER |
| MNFRAME.006A6 | 08/942,069 | 10/01/97 | METHOD FOR THE HOT ADD OF A MASS STORAGE ADAPTER ON A SYSTEM INCLUDING A STATICALLY LOADED ADAPTER DRIVER |
| MNFRAME 006A7 | 08/942,465 | 10/01/97 | METHOD FOR THE HOT ADD OF A NETWORK ADAPTER ON A SYSTEM INCLUDING A STATICALLY LOADED ADAPTER DRIVER |
| MNFRAME.006A8 | 08/962,963 | 10/01/97 | METHOD FOR THE HOT ADD OF A MASS STORAGE ADAPTER ON A SYSTEM INCLUDING A DYNAMICALLY LOADED ADAPTER DRIVER |
| MNFRAME.006A9 | 5,889,965 | 10/01/97 | METHOD FOR THE HOT SWAP OF A NETWORK ADAPTER ON A SYSTEM INCLUDING A DYNAMICALLY LOADED ADAPTER DRIVER |
| MNFRAME.006A10 | 08/942,336 | 10/01/97 | METHOD FOR THE HOT SWAP OF A MASS STORAGE ADAPTER ON A SYSTEM INCLUDING A STATICALLY LOADED ADAPTER DRIVER |
| MNFRAME.006A11 | 08/942,459 | 10/01/97 | METHOD FOR THE HOT SWAP OF A NETWORK ADAPTER ON A SYSTEM INCLUDING A STATICALLY LOADED ADAPTER DRIVER |
| MNFRAME.006A12 | 08/942,458 | 10/01/97 | METHOD FOR THE HOT SWAP OF A MASS STORAGE ADAPTER ON A SYSTEM INCLUDING A DYNAMICALLY LOADED ADAPTER DRIVER |

BACKGROUND OF THE INVENTION

1. Field of the Invention

The field of the invention relates to I/O adapters in computer systems. More particularly, the field of invention relates to the hot add and swap of adapters and input/output platforms on computer systems.

2. Description of the Related Technology

As enterprise-class servers, which are central computers in a network that manage common data, become more powerful and more capable, they are also becoming ever more sophisticated and complex. For many companies, these changes lead to concerns over server reliability and manageability, particularly in light of the increasingly critical role of server-based applications. While in the past many systems administrators were comfortable with all of the various components that made up a standards-based network server, today's generation of servers can appear as an incomprehensible, unmanageable black box. Without visibility into the underlying behavior of the system, the administrator must "fly blind." Too often, the only indicators the network manager has on the relative health of a particular server is whether or not it is running.

It is well-acknowledged that there is a lack of reliability and availability of most standards-based servers. Server downtime, resulting either from hardware or software faults or from regular maintenance, continues to be a significant problem. By one estimate, the cost of downtime in mission critical environments has risen to an annual total of $4.0 billion for U.S. businesses, with the average downtime event resulting in a $140 thousand loss in the retail industry and a $450 thousand loss in the securities industry. It has been reported that companies lose as much as $250 thousand in employee productivity for every 1% of computer downtime. With emerging Internet, intranet and collaborative applications taking on more essential business roles every day, the cost of network server downtime will continue to spiral upward.

A significant component of cost is hiring administration personnel. These costs decline dramatically when computer systems can be managed using a common set of tools, and where they don't require immediate attention when a failure occurs. Where a computer system can continue to operate even when components fail, and defer repair until a later time, administration costs become more manageable and predictable.

While hardware fault tolerance is an important element of an overall high availability architecture, it is only one piece of the puzzle. Studies show that a significant percentage of network server downtime is caused by transient faults in the I/O subsystem. These faults may be due, for example, to the device driver, the device firmware, or hardware which does not properly handle concurrent errors, and often causes servers to crash or hang. The result is hours of downtime per failure, while a system administrator discovers the failure, takes some action, and manually reboots the server. In many cases, data volumes on hard disk drives become corrupt and must be repaired when the volume is mounted. A dismount-and-mount cycle may result from the lack of "hot pluggability" or "hot plug" in current standards-based servers. Hot plug refers to the addition and swapping of peripheral adapters to an operational computer system. Diagnosing intermittent errors can be a frustrating and time-consuming process. For a system to deliver consistently high availability, it must be resilient to these types of faults.

In a typical PC-based server, upon the failure of an adapter, which is a printed circuit board containing microchips, the server must be powered down, the hot added adapter and adapter driver installed, the server powered back up and the operating system reconfigured.

However, various entities have tried to implement the hot plug of these adapters to a fault tolerant computer system. One significant difficulty in designing a hot plug system is protecting the circuitry contained on the adapter from being short-circuited when an adapter is added to a powered system. Typically, an adapter contains edge connectors which are located on one side of the printed circuit board. These edge connectors allow power to transfer from the system bus to the adapter, as well as supplying data paths between the bus and the adapter. These edge connectors fit into a slot on the bus on the computer system. A traditional hardware solution for "hot plug" systems includes increasing the length of at least one ground contact of the adapter, so that the ground contact on the edge connector is the first connector to contact the bus on insertion of the I/O adapter and the last connector to contact the bus on removal of the adapter. An example of such a solution is described in U.S. Pat. No. 5,210,855 to Thomas M. Bartol.

U.S. Pat. No. 5,579,491 to Jeffries discloses an alternative solution to the hot installation of I/O adapters. Here, each hotly installable adapter is configured with a user actuable initiator to request the hot removal of an adapter. The I/O adapter is first physically connected to a bus on the computer system. Subsequent to such connection a user toggles a switch on the I/O adapter which sends a signal to the bus controller. The signal indicates to the bus controller that the user has added an I/O adapter. The bus controller then alerts the user through a light emitting diode (LED) whether the adapter can be installed on the bus.

However, the invention disclosed in the Jeffries patent also contains several limitations. It requires the physical modification of the adapter to be hotly installed. Another limitation is that the Jeffries patent does not teach the hot addition of hot added adapter controllers or bus systems. Moreover, the Jeffries patent requires that before an I/O adapter is removed, another I/O adapter must either be free and spare or free and redundant. Therefore, if there was no free adapter, hot removal of an adapter is impossible until the user added another adapter to the computer system.

Hardware developers have recently created the Intelligent I/O ($I_2O$) architecture to facilitate the development of hot added adapters for servers. Traditionally, a computer has one processor for handling machine instructions. This processor is called the central processing unit (CPU). The $I_2O$ architecture defines a hardware topology in which a secondary processor in addition to the usual CPU is provided for handling I/O transactions. The secondary processor is located on an input/output platform (IOP) which controls a plurality of I/O devices. The architecture also defines a split device driver model wherein an operating system module (OSM) with operating system code is located on the host CPU and a device driver module (DDM) is located on the IOP to control I/O devices. The OSM and the DDM communicate with each other through a messaging layer which is defined by the $I_2O$ architecture. The split device driver architecture allows operating system vendors and hardware vendors to each provide only one module for each type of adapter. Thus, an OSM for a LAN adapter is compatible with all classes of LAN adapters, and similarly the DDM provided by the hardware vendor for the LAN device is compatible with all $I_2O$ compliant operating systems.

Recently, the $I_2O$ architecture has been amended to define some hot plug primitives by which an operating system can request the hot add and removal of a IOP or an adapter which is located on the IOP. However, the $I_2O$ architecture has failed to define or describe the mechanism by which the configuration information of the added or swapped device is maintained. Moreover, the $I_2O$ architecture fails to solve the problem of how devices are to be added under the Peripheral Component Interconnect (PCI) architecture. In the PCI architecture, a bus address, a set of memory addresses, and a set of I/O memory addresses for each memory device have to be configured for a particular range depending on the physical location of each of the devices. The bus number, memory address, and the I/O memory addresses are traditionally defined upon the start-up of the computer. If a PCI device is added at a subsequent time, the system must be able to allocate resources for the newly added device appropriate for the slot in which the device is located. However, traditional system initialization routines fail to reserve bus address, memory addresses, and I/O memory for the new device.

Further, current operating systems do not by themselves provide the support users need to hot add and swap an adapter under the $I_2O$ architecture. System users need software that will freeze and resume the communications of their adapters in a controlled way. The software needs to support the hot add of various peripheral adapters such as mass storage and network adapters. Additionally, the software should support adapters that are designed for various bus systems such as Peripheral Component Interconnect, CardBus, Microchannel, Industrial Standard Architecture (ISA), and Extended ISA (EISA). System users also need software to support the hot add and swap of input/output platforms with embedded adapters.

A related technology, not to be confused with hot plug systems using the I$_2$O architecture, is Plug and Play defined by Microsoft and PC product vendors. Plug and Play is an architecture that facilitates the integration of PC hardware adapters to systems. Plug and Play adapters are able to identify themselves to the computer system after the user installs the adapter on the bus. Plug and Play adapters are also able to identify the hardware resources that they need for operation. Once this information is supplied to the operating system, the operating system can load the adapter drivers for the adapter that the user had added while the system was in a non-powered state. Plug and Play is used by both Windows 95 and Windows NT to configure adapter cards at boot-time. Plug and Play is also used by Windows 95 to configure devices in a docking station when a hot notebook computer is inserted into or removed from a docking station.

Therefore, a need exists for improvements in server management of I$_2$O devices which will result in continuous operation despite adapter failures. System users must be able to replace failed components, upgrade outdated components, and add new functionality, such as new network interfaces, disk interface adapters and storage, without impacting existing users. Additionally, system users need a process to hot add their legacy adapters on I$_2$O platforms, without purchasing hot added adapters that are specifically designed for hot plug. As system demands grow, organizations must frequently expand, or scale, their computing infrastructure, adding new processing power, memory, mass storage and network adapters. With demand for 24-hour access to critical, server-based information resources, planned system downtime for system service or expansion has become unacceptable.

SUMMARY OF THE INVENTION

One embodiment of the invention includes a computer capable of hot adding an adapter on an expansion bus of an input/output platform, comprising a computer including a memory, a plurality of I/O devices, an input/output platform having an expansion bus, wherein the input/output platform is connected to the computer, a plurality of adapters connected to the expansion bus of the input/output platform, wherein one or more adapters control the I/O to selected ones of the I/O devices, and a configuration manager capable of programming a hot added adapter on the input-output platform so that the hot added adapter can communicate with the computer.

Another embodiment of the invention includes a computer capable of hot adding an input/output platform having at least one adapter, comprising a computer, a hot added input/output platform having at least one adapter, wherein the hot added input/output platform is connected to the computer, and a configuration manager capable of programming the hot added input/output platform so that the at least one adapter on the hot added input/output platform can communicate with the computer.

Yet another embodiment of the invention includes a computer capable of hot swapping an adapter which is controlled by an input/output platform, comprising a computer including a memory, an input/output platform having at least one embedded adapter, and a configuration manager capable of suspending the communications to the at least one adapter on the input/output platform, and storing the configuration information of the at least one adapter in the memory of the computer.

Another embodiment of the invention includes a computer capable of hot swapping an adapter on an expansion bus of an input/output platform, comprising a computer including a memory, an input/output platform having an expansion bus, wherein the input/output platform is connected to the computer, an adapter, which is in the expansion bus of the input/output platform, and a configuration manager capable of suspending the communications to the adapter, and storing the configuration information of the adapter in the memory of the computer.

Yet another embodiment of the invention includes a system for adding an adapter to an expansion bus of an input/output platform, comprising means for adding an adapter to a slot in an expansion bus of an input/output platform, and means for activating the adapter so that I/O is communicated between the added adapter and an operational computer.

Yet another embodiment of the invention includes a computer capable of hot swapping an adapter on an expansion bus of an input/output platform, comprising a computer including a memory, wherein the computer sparsely allocates system resources upon boot-up, an input/output platform having at least one embedded adapter, a device driver module, which is operating on the input/output platform, an operating system having an operating system module, which is in communication with the device driver module, and a configuration manager capable of suspending the communications between the operating system module and the device driver module, and storing the configuration information of the at least one embedded adapter in the memory of the computer.

DETAILED DESCRIPTION OF THE INVENTION

The following detailed description presents a description of certain specific embodiments of the present invention. However, the present invention can be embodied in a multitude of different ways as defined and covered by the claims. In this description, reference is made to the drawings wherein like parts are designated with like numerals throughout.

Figure 1:
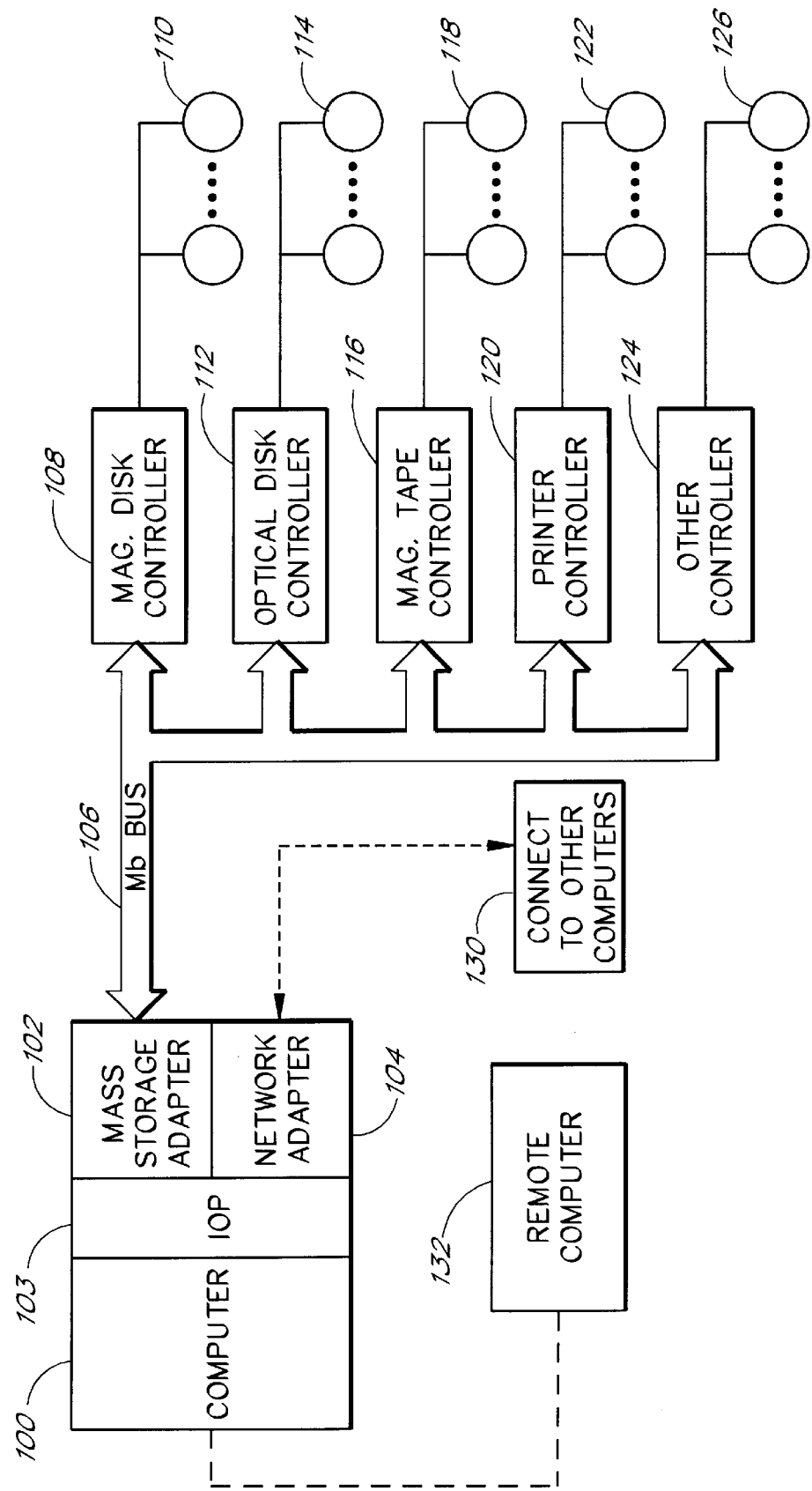
FIG. 1 is a top-level block diagram showing a fault tolerant computer system, including an input/output platform (IOP).

FIG. 1 is a block diagram showing one embodiment of a fault tolerant computer system. Typically the computer system is one server in a network of servers and is communicating with client computers. Such a configuration of computers is often referred to as a client-server architecture. A fault tolerant server is useful for mission critical applications such as the securities business where any computer down time can result in catastrophic financial consequences. A fault tolerant computer will allow for a fault to be isolated and not propagate through the system thus providing complete or minimal disruption to continuing operation. Fault tolerant systems also provide redundant components, such as adapters, so service can continue even when one component fails.

The system includes a fault tolerant computer system 100 having an I/O platform (IOP) 103. An IOP 103 comprises a processor, a memory, and at least one I/O adapter (not shown in FIG. 1). The IOP 103 is managed independently from other processors in the system and is configured to process I/O transactions. The IOP 103 controls a mass storage adapter 102 and a network adapter 104 such as for use in a Local Area Network (LAN). The mass storage adapter 102 may contain one or more of various types of device controllers: a magnetic disk controller 108 for magnetic disks 110, an optical disk controller 112 for optical disks 114, a magnetic tape controller 116 for magnetic tapes 118, a printer controller 120 for various printers 122, and any other type of controller 124 for other devices 126. For such multi-function adapters, the controllers may be connected by a bus 106 such as a PCI bus. The peripheral devices communicate and are connected to each controller, by a mass storage bus. In one embodiment, the bus may be a Small Computer System Interface (SCSI) bus. In a typical server configuration there is more than one mass storage adapter connected to the computer 100. Adapters and I/O devices are off-the-shelf products. For instance, sample vendors for a magnetic disk controller 108 and magnetic disks 110 include Qlogic, Intel, and Adaptec. Each magnetic hard disk may hold multiple Gigabytes of data.

The network adapter 104, which is sometimes referred to as a network interface card (NIC), allows digital communication between the fault tolerant computer system 100 and other computers (not shown) such as a network of servers via a connection 130. In certain configurations there may be more than one network controller adapter connected to the computer 100. For LAN embodiments of the network adapter, the protocol used may be, for example, Ethernet (IEEE 802.3), Token Ring (IEEE 802.5), Fiber Distributed Datalink Interface (FDDI), Asynchronous Transfer Mode (ATM) or any other conventional protocol. Typically, the mass storage adapter 102 and the network adapter 104 are connected to the computer using a standards-based bus system. In different embodiments of the present invention, the standards based bus system could be Peripheral Component Interconnect (PCI), Microchannel, SCSI, Industrial Standard Architecture (ISA) and Extended ISA (EISA) architectures.

Figure 2:
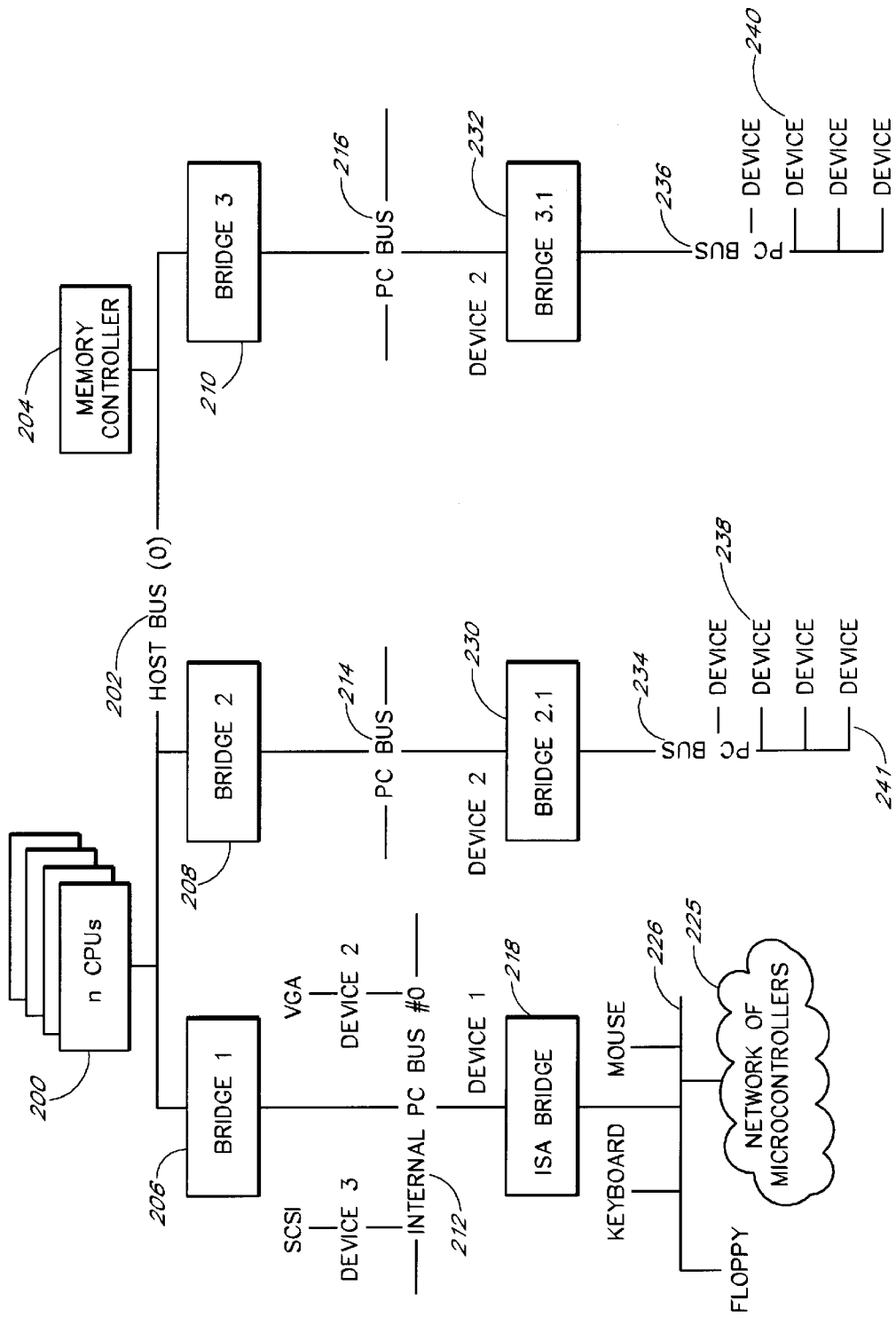
FIG. 2 is a block diagram showing a first embodiment of a multiple bus configuration connecting I/O adapters and a network of microcontrollers to the clustered CPUs of the fault tolerant computer system, shown in FIG. 1.

FIG. 2 shows one embodiment of the bus structure of the fault tolerant computer system 100. A number 'n' of central processing units (CPUs) 200 are connected through a host bus 202 to a memory controller 204, which allows for access to memory by the other system components. In one embodiment, there are four CPUs 200, each being an Intel Pentium Pro or Pentium II microprocessor. However, many other general purpose or special purpose parts and circuits could be used. A number of bridges 206, 208 and 210 connect the host bus to, respectively, three high speed I/O bus systems 212, 214, and 216. The bus systems 212, 214 and 216, referred to as PC buses, may be any standards-based bus system such as PCI, ISA, EISA and Microchannel. In one embodiment of the invention, the bus system 212 is PCI. Alternative embodiments of the invention employ a proprietary bus. An ISA Bridge 218 is connected to the bus system 212 to support legacy devices such as a keyboard, one or more floppy disk drives and a mouse. A network of microcontrollers 225 is also interfaced to the ISA bus 226 to monitor and diagnose the environmental health of the fault tolerant system. A more detailed description of the microcontroller network 225 is contained in the U.S. patent application Ser. No. 08/942,402, "Diagnostic and Managing Distributed Processor System" to Johnson. Other embodiments may not use the network 225.

A bridge 230 and a bridge 232 connects, respectively, the PC bus 214 with PC bus 234 and the PC bus 216 with the PC bus 236 to provide expansion slots for peripheral devices or adapters. Separating the devices 238 and 240, respectively, on PC buses 234 and 236 reduces the potential that an adapter failure or other transient I/O error affect the entire bus and corrupt data, bring the entire system down or stop the system administrator from communicating with the system. The devices 238 and 240 are electrically and mechanically connected to the PC buses 234 and 236 by PC slots such as slot 241. Hence, an adapter is "plugged" into a slot. In one embodiment of the invention, each slot may be independently powered on and off.

Figure 3:
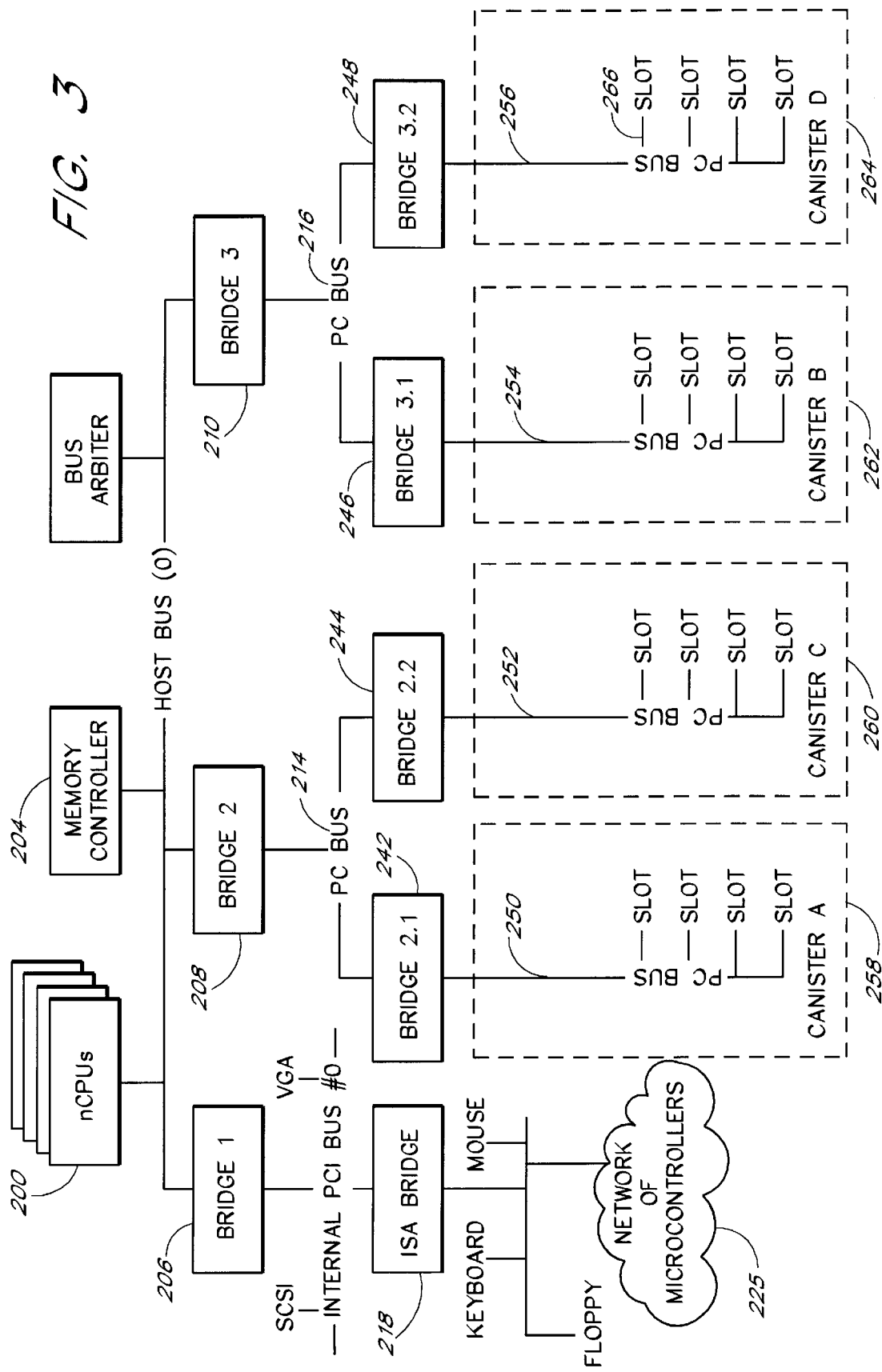
FIG. 3 is a block diagram showing a second embodiment of a multiple bus configuration connecting canisters containing I/O adapters and a network of microcontrollers to the clustered CPUs of the fault tolerant computer system, shown in FIG. 1.

FIG. 3 shows an alternative bus structure embodiment of the fault tolerant computer system 100. The two PC buses 214 and 216 contain a set of bridges 242–248 to a set of PC bus systems 250–256. As with the PC buses 214 and 216, the PC buses 250–256 can be designed according to any type of bus architecture including PCI, ISA, EISA, and Microchannel. The PC buses 250–256 are connected, respectively, to a canister 258, 260, 262 and 264. The canisters 258–264 are casings for a detachable bus system and provide multiple PC slots 266 for adapters. In one embodiment, each canister may be independently powered on and off.

The embodiments of the invention illustrated with respect to FIGS. 2 and 3 both provide for the sparse allocation of system resources upon the initialization or boot-up of the computer system 100. For example, referring to FIG. 3, the computer system 100 sparsely apportions the bus numbers for each of the buses 250–256 that are on the system during initialization. Thus, the computer system 100 assigns a range of bus numbers for each of the buses, thereby allowing the future assignment of additional bus numbers for a secondary bus that may be inserted into one of the bus slots.

Similarly, the I/O addresses and the memory are sparsely allocated for each of the buses and the devices. Each of the bus systems is assigned a range of addresses for memory and I/O. Thus, when a new device is placed in one of the bus slots, memory and I/O may be allocated for the adapter from this range of memory without the risk that other adapters from a different bus have reserved all of the space dedicated to the bus.

Figure 4:
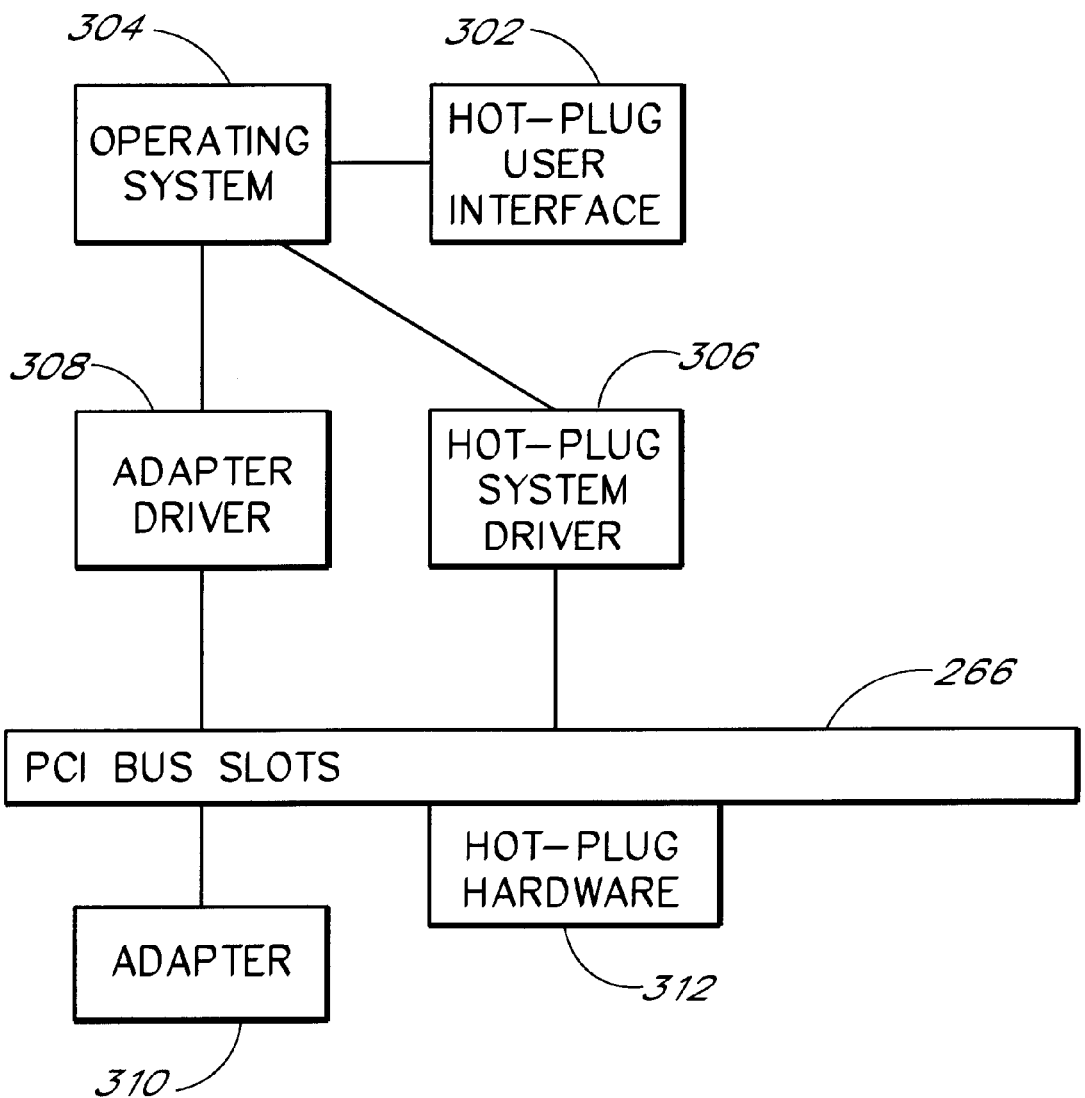
FIG. 4 is a block diagram illustrating a portion of the fault tolerant computer system, shown in FIG. 1.

FIG. 4 is a block diagram illustrating hardware and software components of the computer system 100 relating to hot plugging an adapter. A hot plug user interface 302 accepts requests by a user such as a system manager or administrator to perform the hot add or a hot swap of an adapter 310. The user interface 302 preferably communicates through an industry standard operating system 304 such as NetWare, to the hot plug system driver 306 and an adapter driver 308. In an alternative embodiment of the invention, a proprietary operating system may be utilized.

The hot plug system driver 306 controls the adapter driver 308 for a hot plug operation. The hot plug system driver 306 stops and resumes the communications between the adapter 310 and the adapter driver 308. During a hot add or swap of the adapter 310, the hot plug hardware 312 deactivates the power to the PC slots 241 and 266 (FIGS. 2 and 3). One embodiment of the hot plug hardware 312 may include the network of microcontrollers 225 (FIGS. 2 and 3) to carry out this functionality.

The adapter 310 could be any type of peripheral device such as a network adapter, a mass storage adapter, or a sound board. Typically, however, adapters involved in providing service to client computers over a network, such as mass storage, network and communications adapters, would be the primary candidates for hot swapping or adding in a fault tolerant computer system such as the computer system 100 (FIG. 1). Further, the adapter 310 could be an IOP device as defined by the I₂O architecture. The adapter 310 is physically connected to the hot plug hardware by PC slots such as slots 241 and 266 (FIGS. 2 and 3).

Figure 5:
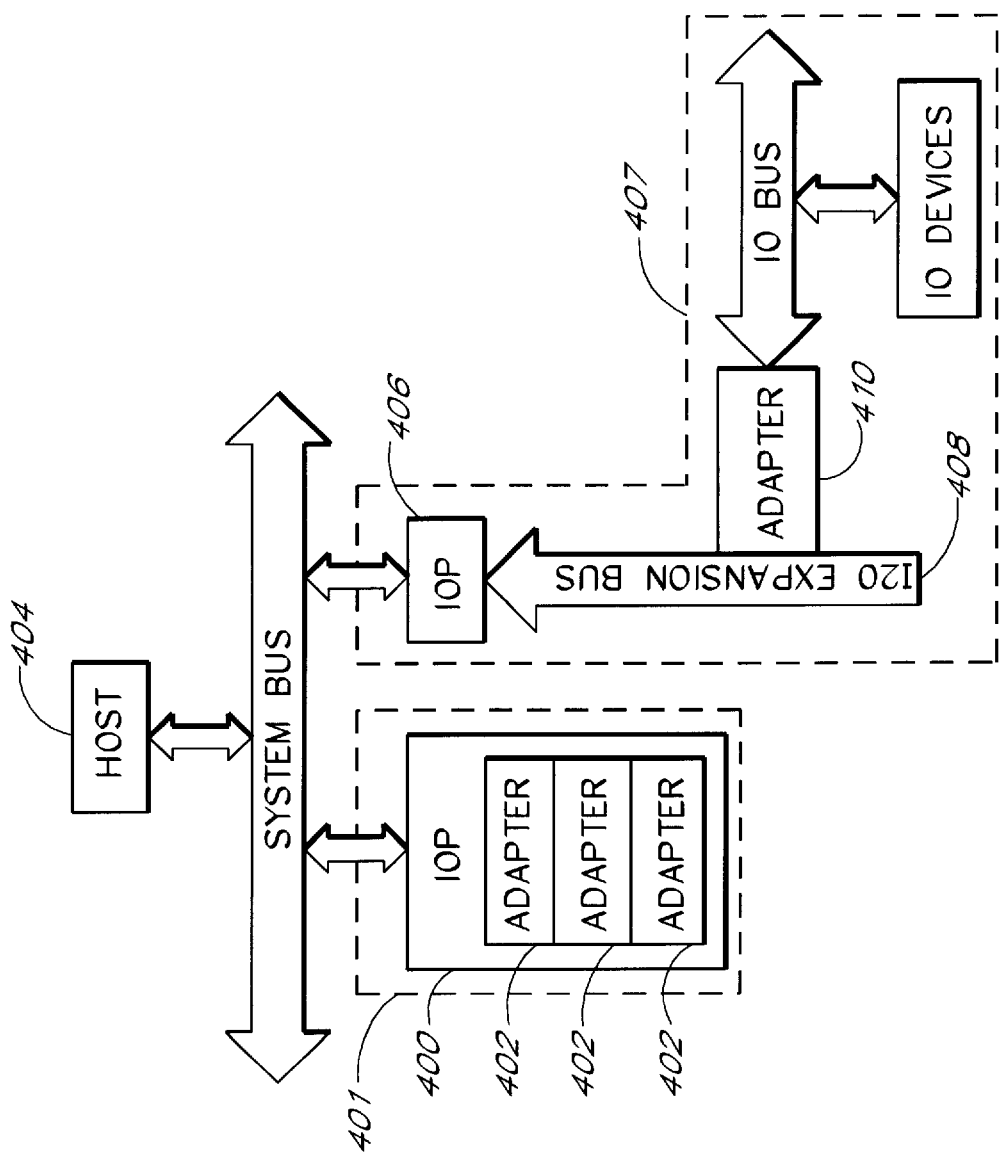
FIG. 5 is a block diagram illustrating two different intelligent I/O (I$_2$O) subsystems in a computer system.

FIG. 5 is a block diagram illustrating two different types of intelligent I/O (I₂O) subsystems with hot plug functionality. Each of these two subsystems may act as the IOP 103 of FIG. 1. A first subsystem 401 has an I/O platform (IOP) 400 including a plurality of embedded adapters 402. The IOP 400 including its adapters 402 is hot pluggable. A second subsystem 407 includes an IOP 406 having an expansion bus 408 for the hot add and swap of an adapter 410. Although only one adapter 410 is illustrated in the subsystem 407, more than one adapter 410 may be located on the expansion bus 408. Each of the adapters 410 which are located on the expansion bus 408 are hot pluggable. For the purposes of discussion, the IOP 406 of subsystem 407 will be assumed to be not configured to be hot pluggable. However, the IOP 406 could readily be made hot pluggable.

The adapters 402 and 410 may include various types of device controllers, such as: a magnetic disk controller for magnetic disks, an optical disk controller for optical disks, a magnetic tape controller for magnetic tapes, a printer controller for various printers, and any other type of controller for other devices (not shown in FIG. 5). Further, the adapters 402 and 410 may include a network adapter, which allows digital communication between a host 404 and other computers (not shown). The IOP 400 and 406 may, in one embodiment, be any industry standard I/O adapter such as, for example, the Intel IQ80960RP, the Intel IQ80960RD66, or the Cyclone PCI914.

Figure 6:
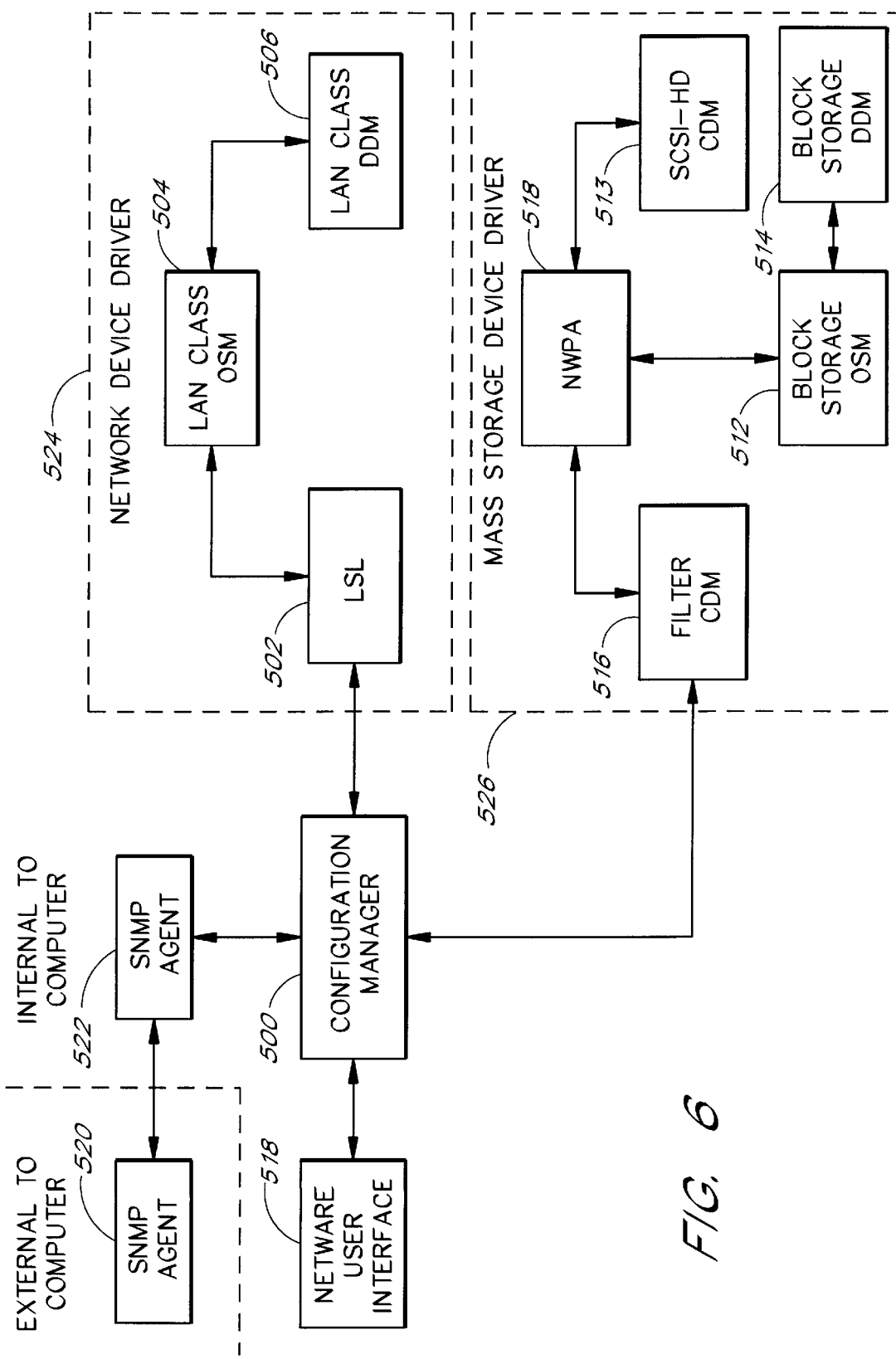
FIG. 6 is a block diagram illustrating certain device driver components of the NetWare Operating System and one embodiment of a configuration manager which reside on the fault tolerant computer system, shown in FIG. 1.

FIG. 6 is a block diagram illustrating certain system components of the NetWare Operating System and the software components of one embodiment of the invention. A configuration manager 500 is responsible for managing all or some of the adapters 402 and 410 (FIG. 5). The configuration manager 500 keeps track of the configuration information for every managed adapter located on the fault tolerant computer system 100 shown in FIG. 1. The configuration manager 500 also allocates resources for every managed adapter and initializes each managed adapters registers during a hot swap or add operation. The registers of an adapter 310 are memory addresses which may be used to issue a command to the adapter, or which may indicate the status of the adapter.

Novell provides two drivers for adapters, including a network device driver 524 and a mass storage driver 526. Each of these two drivers define an interface, called operating system modules (OSMs) for I₂O device driver modules (DDM) to communicate with the NetWare Operating System. First, Novell provides a LAN class OSM 504 for network adapter device drivers. Second, Novell provides a block storage OSM 512 for mass storage adapter device drivers. Each of these interfaces will be described below.

With respect to network device drivers, such as a driver 524, the LAN class OSM 504 is used by the NetWare operating to communicate with an the LAN class DDM 506. The LAN class OSM 504 allows multiple LAN adapters, such as the adapter 104 (FIG. 1) to co-exist on network systems, and to facilitate the task of writing device driver software. The I₂O specification promulgated by the I₂O Special Interest Group (SIG) describes the set of interfaces and software modules used by hardware vendors to interface with the LAN class OSM 504. The LSL 502 is the interface between drivers and protocol stacks (not shown). A protocol stack is well known software having a layered communication architecture, whereby each layer has a well defined interface.

The LAN class DDM 506 executes on an IOP, such as IOP 400 or IOP 407 shown in FIG. 5. An instance of a LAN class DDM 506 exists for each LAN adapter which is controlled by the IOP. Typically, a LAN adapter vendor provides a DDM for each class of device. The LAN class DDM 506 contains no operating system specific code. For instance, the DDM does not directly interface to Novell NetWare or any other OS running in the computer. The LAN class DDM 506 communicates with the LAN Class OSM 504 through a messaging layer which is defined by the I₂O architecture. These messages correspond to primitives which allow the hot add and hot swap of adapters plugged into slots controlled by an IOP.

With respect to mass storage device drivers, such as a driver 526, the NetWare Peripheral Architecture (NWPA) 518 is a software architecture developed by Novell which provides an interface for mass storage developers to interface with the NetWare operating system. The NWPA 518 is divided into two components: a block storage OSM 512 and a custom device module (CDM) 513.

Similar to the LAN class DDM 506 for network devices, a block storage DDM 514 provides the interface to the mass storage adapters and their devices. The block storage OSM 512 contains no operating system specific code. The block storage DDM 514 communicates with the block storage OSM 512 through an messaging layer which is defined by the I₂O architecture. Typically, a mass storage adapter vendor provides the block storage DDM 514. The CDM 513 is the component of the NWPA 518 that regulates the mass storage adapters 102.

A filter CDM 516, which is not typically a part of the Novell NetWare Operating System, is used to locate the block storage OSM 512, register adapter events, and process the I/O suspend and I/O restart requests from the configuration manager 500. To be noted, the process of making and using the filter CDM is commonly known in the device driver technology.

If a user desires to perform a hot swap of a device, a NetWare user interface 518 is used to request the configuration manager 500 to freeze and restart communications to a specified adapter 310. A remote Simple Network Management Protocol (SNMP) agent 520 can also start the request to freeze and resume communications to the configuration manager 500 through a local SNMP agent 521. SNMP is one of a set of protocols called TCP/IP, which is specifically designed for use in managing computer systems. In one embodiment of the invention, the computers would be similar to the fault tolerant computer system of FIG. 1 and connected in a server network via connection 130.

Figure 7:
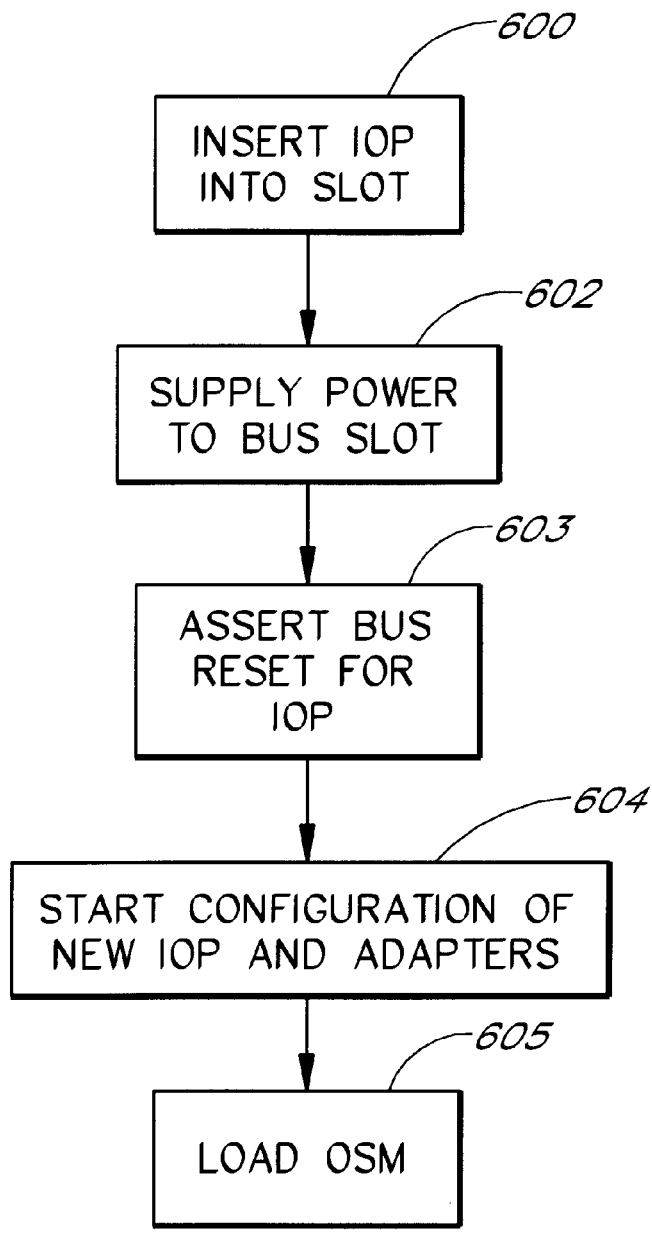
FIG. 7 is an operational flowchart illustrating the process by which a user performs a hot add of an IOP such as is shown in FIG. 5.
Figure 8:
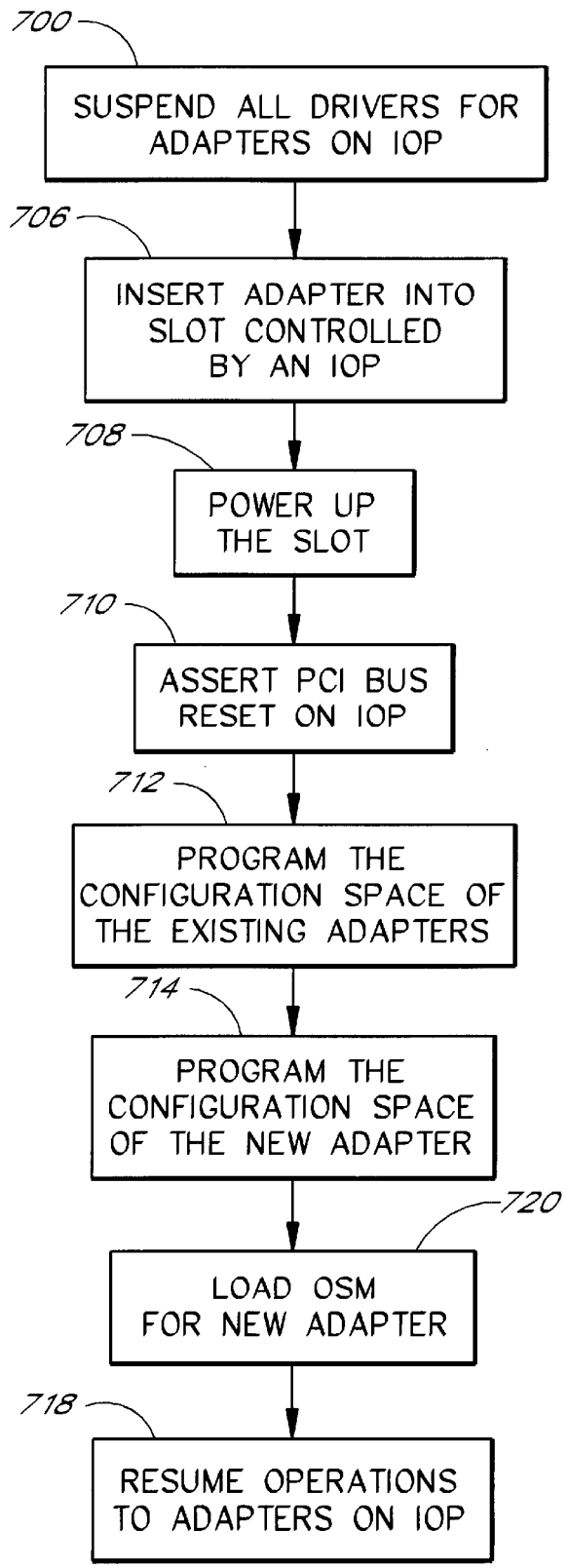
FIG. 8 is an operational flowchart showing the process by which a user performs a hot add of an adapter on the expansion bus of an IOP.
Figure 9:
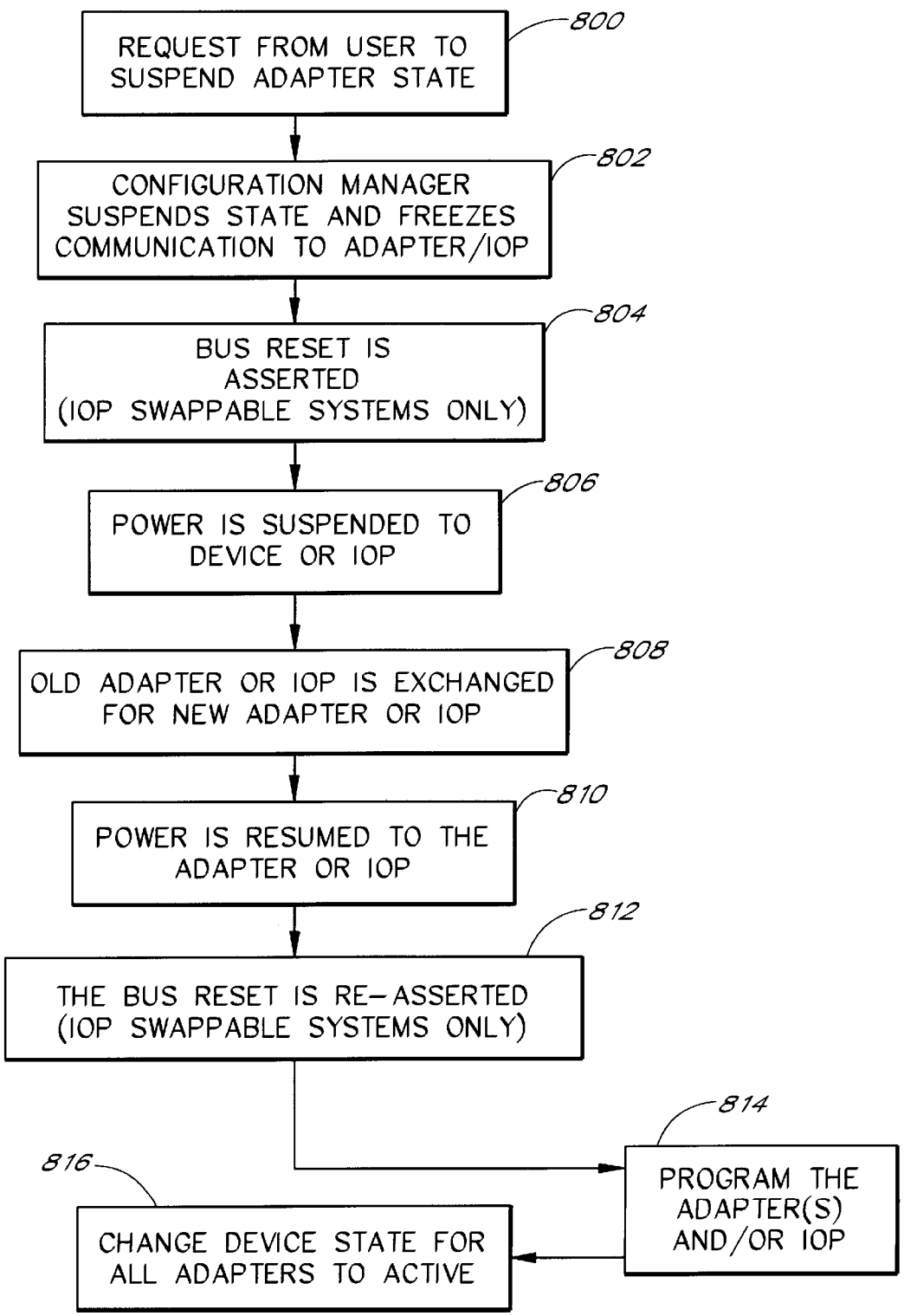
FIG. 9 is an operational flowchart showing the process by which a user performs a hot swap of an IOP or an adapter on the expansion bus of an IOP.

FIGS. 7, 8, and 9 illustrate a generic process by which alternative embodiments of the present invention perform the hot add and swap of devices. Embodiments of the invention may use commercial operating systems, such as Macintosh O.S., OS/2, VMS, DOS, Windows 3.1/95/98 or UNIX to support hot add and swap. Furthermore, proprietary operating systems may support hot add and hot swap. However, the description of FIGS. 7, 8 and 9 will refer to the hot add and swap of I₂O compliant devices under the NetWare Operating System.

Referring now to FIG. 7, a flowchart of one embodiment of the process to hot add an IOP with embedded devices, such as IOP 400 of FIG. 5, is illustrated. The process described by FIG. 7 is generic to various implementations of the invention. However, the following description of FIG. 7 focuses on the hot add of an IOP (FIG. 5) under the NetWare Operating System.

Starting in state 600, a user inserts an IOP into one of the PC bus slots, such as the slot 241. At this point, the hot plug hardware 312 has not turned on the power to the IOP's slot, although the computer system 100 is operational. Since the IOP's slot is not powered and is physically isolated from any other devices which are attached to the bus 234, the IOP will not be damaged by a short circuit during the insertion process, and will not create problems for the normal operation of the computer system 100.

Moving to state 602, the configuration manager 500 (FIG. 6) is notified that the IOP is now in the slot, and requests the hot plug hardware 312 (FIG. 4) to supply power to the IOP's slot. In one embodiment of the invention, the hot plug hardware 312 automatically detects the presence of the newly added IOP and informs the configuration manager 500. In another embodiment of the invention, the user notifies the hot plug hardware 312 that the IOP is connected to one of the PC slots 241 (FIG. 2).

Once an IOP is added to the computer system, the configuration manager 500 asserts a bus reset which initializes the IOP at a state 603. System resources must now be allocated for the IOP and for the adapters that are embedded on the IOP. The configuration manager 500 initializes the new IOP and provides it with the information about any other IOPs that may be on the system. The configuration manager 500 configures the newly added adapters on the IOP by writing information to each hot added adapters' configuration space registers (state 604).

Traditionally, each adapter's resources on the IOP are allocated by the Basic Input Output Services (BIOS) which is typically stored in a nonvolatile memory in the computer system 100. The BIOS are software service routines which are invoked during the boot up of the computer system 100. The BIOS programs the I/O ports, or memory locations of each adapter on the computer system 100. However, since a hot added adapter was not present during the execution of the BIOS initialization routines, the configuration manager 500 must configure the hot added adapter in the same manner that a preconfigured adapter is programmed by the BIOS. The process for configuring the adapters on the IOP is explained in greater detail below in reference to FIGS. 12A and 12B.

Finally, at a state 605, the process of the configuration manager 500 loads an appropriate OSM depending on the type of adapter on the new IOP. For example, if the IOP contains a LAN adapter, the configuration manager 500 will load the LAN class OSM 504 into the memory of the computer 100.

FIG. 8 is a flowchart illustrating the process for hot add of an adapter on the expansion bus of an IOP. The process described by FIG. 8 is generic to various embodiments of the invention. However, the following description of FIG. 8 will generally refer to the hot add of an adapter to the expansion bus subsystem 407 of FIG. 5 under the NetWare Operating System.

Starting in state 700, all adapters already operating on the expansion bus 408 are located, and I/O activity involving those adapters is suspended. In one embodiment, the SNMP agent 520 (FIG. 6)or the NetWare User Interface 518 locates all of the adapters, and initiates the request for the suspension for every adapter, such as the adapter 410, on the expansion bus 408. In another embodiment, the SNMP agent 520 or the NetWare User Interface 518 requests the configuration manager 500 to suspend the adapters. The configuration manager 500 then locates all devices and suspends the I/O for each adapter located on the expansion bus 408.

The configuration manager 500 initiates the suspension of I/O by sending a shutdown command to either the NWPA 518 for the mass storage adapters 102 or the LSL 502 for the network adapter 104. The purpose of the suspension is to provide an orderly shutdown of the communications between the IOP and the other adapters on the expansion bus, since at a state 710 the bus will be reset.

Proceeding to state 706, the user inserts an adapter into one of the expansion slots on the expansion bus 408. The hot plug hardware 312 (FIG. 4) then restarts, at the request of the configuration manager 500, the power to the slot of the hot added adapter (state 708). The bus reset bit is then asserted (state 710) to cause the IOP to re-initialize each of the adapters on the expansion bus 408. In one embodiment of the invention, this assertion is accomplished by the hot plug hardware 312. In another embodiment, the configuration manager 500 asserts the bus reset. The configuration manager 500 re-initializes the configuration space of each adapter that is on the expansion bus 408 (state 712).

Moving to state 714, the configuration manager 500 programs the configuration space of the hot added adapter. It is noted, since an adapter has no power before a hot add, the adapter is in an unknown state after reapplying power. The configuration process for the adapters after the hot add of an adapter is described in greater detail in reference to FIGS. 12A and 12B.

Finally, the configuration manager 500 resumes operations to all of the adapters located on the expansion bus (state 718). For mass storage adapters 102, the configuration manager 500 notifies the NVWPA 518 to resume communications with the mass storage adapters 102. For network adapters 104, the configuration manager 500 notifies the LSL 502 to resume communications with the network adapters 104. In some embodiments of the invention, the configuration manager 500 restarts I/O to all adapters on the expansion bus 408 per such a request to resume communications, while in other embodiments, the user interface 518 or SNMP agent 522 requests the configuration manger 500 to restart each adapter. Finally, at a state 720 the configuration manager 500 loads the appropriate OSM for the hot added adapter.

FIG. 9 is an operational flowchart illustrating the process by which a user performs the hot swap of an IOP 401 (FIG. 5) having embedded adapters or an adapter controlled by an IOP 406 (FIG. 5). The process described by FIG. 9 is generic to various implementations of the invention. However, the following description of FIG. 9 focuses on the hot swap of an IOP with embedded adapters or an adapter controlled by an IOP under the NetWare Operating System.

In general, before starting in state 800, an event has occurred, such as a failure of an adapter, and the user has been informed of the failure. The user has procured a replacement part, and is determined to repair the computer system 100 at this time. The operator may have some other reason for deciding to remove and replace a card, such as upgrading to a new version of the card or its firmware. A user indicates his intention to swap an adapter through the NetWare user interface 518 or a remote SNMP agent 528 (FIG. 6) (state 800).

The configuration manager 500 then suspends the communication between the IOP or adapter, which is to be swapped, and the OSM 504, 512 (state 802). If an IOP is to be swapped, all of the adapters which are controlled by the IOP are also suspended.

Next, for IOP swappable systems, the hot plug hardware 312 asserts a bus reset before disabling power (state 804). In other embodiments, the configuration manager 500 specifically causes a bus reset to be asserted before directing the hot plug hardware 318 to remove power.

The hot plug hardware 312 (FIG. 4) is then directed by the configuration manager 500 to suspend the power to the device which is to be swapped, whether it is the IOP itself or the adapter which is on the expansion bus of the IOP. Proceeding to state 808, the user swaps the old IOP or adapter with a new one.

Continuing to a state 810, the hot plug hardware 312 (FIG. 4) reapplies power to the slot of the new device. If an IOP was swapped, the hot plug hardware 312 re-asserts the bus reset bit, if necessary, after applying power (state 812). In other embodiments, the configuration manager 500 must specifically re-assert the bus reset.

Next, at a state 814, if an adapter was swapped, the configuration manager 500 reprograms the configuration space of the replaced adapter to the same configuration as the old adapter (state 814). If an IOP was swapped, the configuration manager 500 reprograms the configuration space and resumes the communication of each adapter located on the new IOP (state 814). Finally, at state 816, the configuration manager 500 changes the state of all of the adapters to active.

Figure 10:
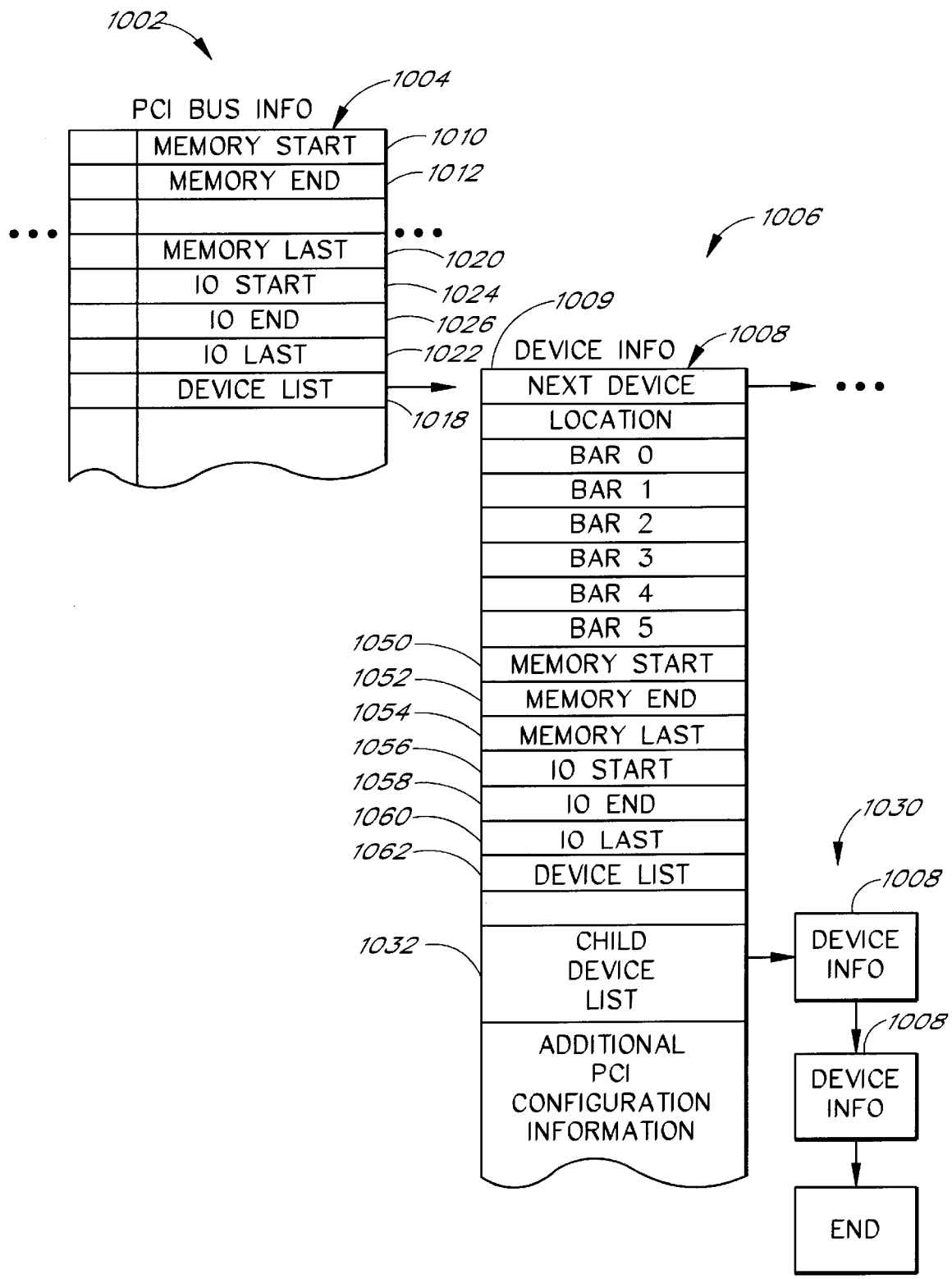
FIG. 10 is a block diagram of a memory structure including configuration information about an IOP and the devices which have controlled the IOP.

Referring to FIG. 10, the configuration manager 500 (FIG. 6) maintains a data structure 1002 in the computer memory which is in the form of an array with each array element, e.g., 1004, of the array representing a PCI bus in the system. Each element of the array 1002 is referred to as a PCI bus information structure. A device information list 1006 may be associated with the PCI bus information structure. The elements 1008 of the device information list 1006 represent devices on the PCI bus. In one embodiment, the data structure is located in the memory storage area of the operating system and is created and maintained by the configuration manager 500.

Each PCI bus array element 1004 may include the memory start and end locations 1010, 1012 for that bus, the I/O start and end locations 1024, 1026 for that bus, and a pointer 1018 to the device information list 1006 containing the configuration information for devices on that bus. In addition, the bus memory structure element 1004 may include the memory location of the last memory space 1020 assignment performed on that bus. The last memory space 1020 may be used when hot adding a device to the bus. In one embodiment, when memory is allocated for devices on a bus, the memory is allocated from the highest address to the lowest. Therefore, the last address allocated is also the smallest address allocated. Similarly, the last I/O address allocated 1022 may also be stored. The PCI bus information structure may also include configuration information defined by the PCI standard under which the system is operating.

Each element 1008 on the device information list 1006 associated with each PCI bus information structure is referred to as a device information structure. Each device information structure typically contains PCI configuration information for a specific device on the bus corresponding to the PCI bus information structure to which the device information list is attached. The PCI configuration information is governed by the PCI specification. As an example, the device information structure includes the PCI vendor identification, PCI device identification, PCI command, PCI status, PCI revision identification, PCI class code, PCI cache line size, PCI latency timer, and the base register addresses (BARs). Each device information structure in the device information list may also include a pointer 1009 to the next device information structure in the device information list or a null indicating the end of the list.

Each device information structure may include, if the device is an IOP, the memory start and end locations 1050, 1052 for the IOP, the I/O start and end locations 1056, 1058 for the IOP. In addition, the device information structure may include the memory location of the last memory space 1054 assignment performed on the IOP. The foregoing information may be used when hot adding a device to the IOP. In one embodiment, when memory is allocated for devices controlled by the IOP, the memory is allocated from the highest address to the lowest. Therefore, the last address allocated is also the smallest address allocated. Similarly, the last I/O address allocated 1060 may also be stored in that array structure.

Further, the device information structure may also include a child device list pointer 1032 to a second device information list 1030 of device information structures if the device is an IOP having an expansion bus or having embedded adapters. The second device information list 1030 contains the device information structures for the adapters that are controlled by an IOP.

Figure 11A:
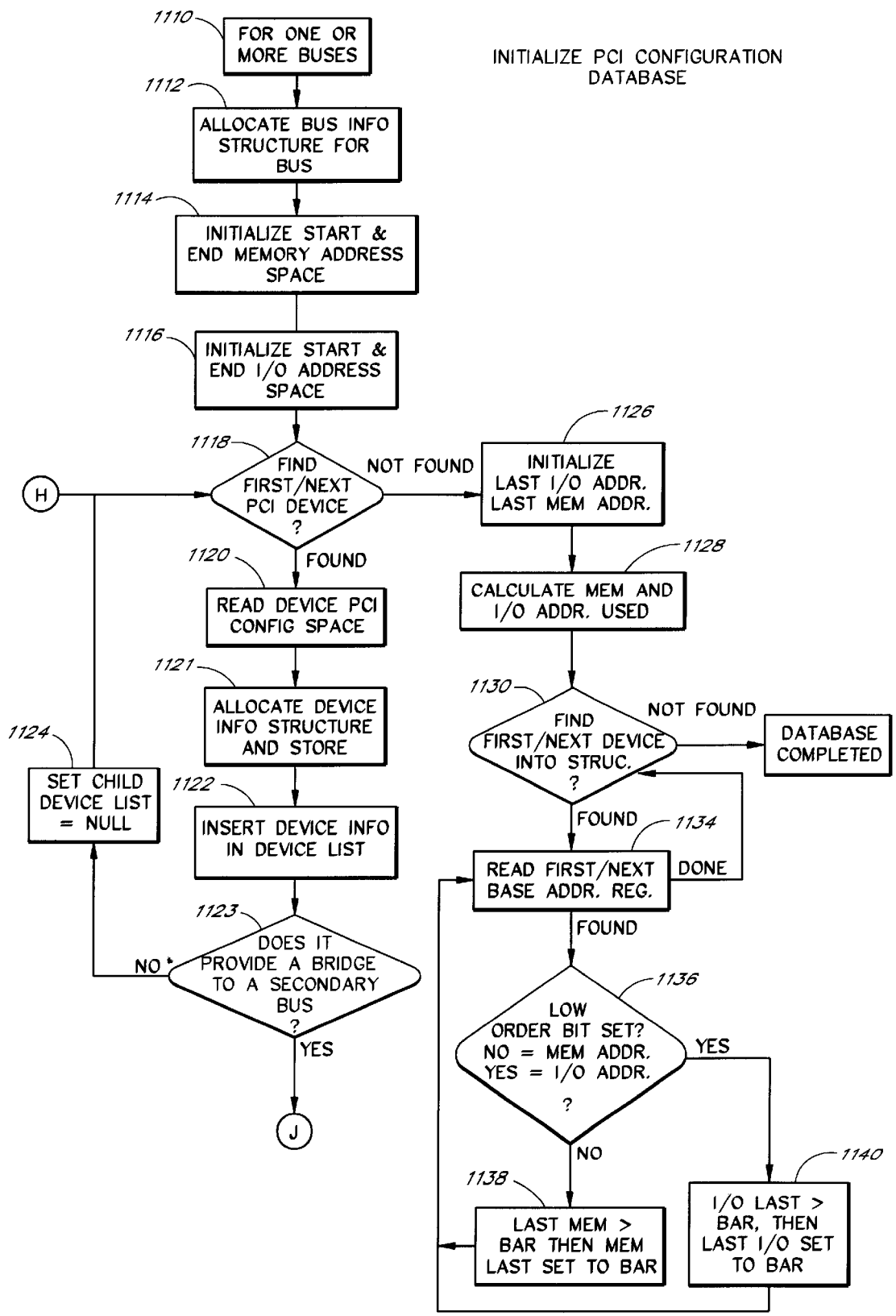
FIGS. 11A and 11B are a flowchart depicting the process followed in one embodiment of the invention for creating the configuration space data structure depicted in FIG. 10.
Figure 11B:
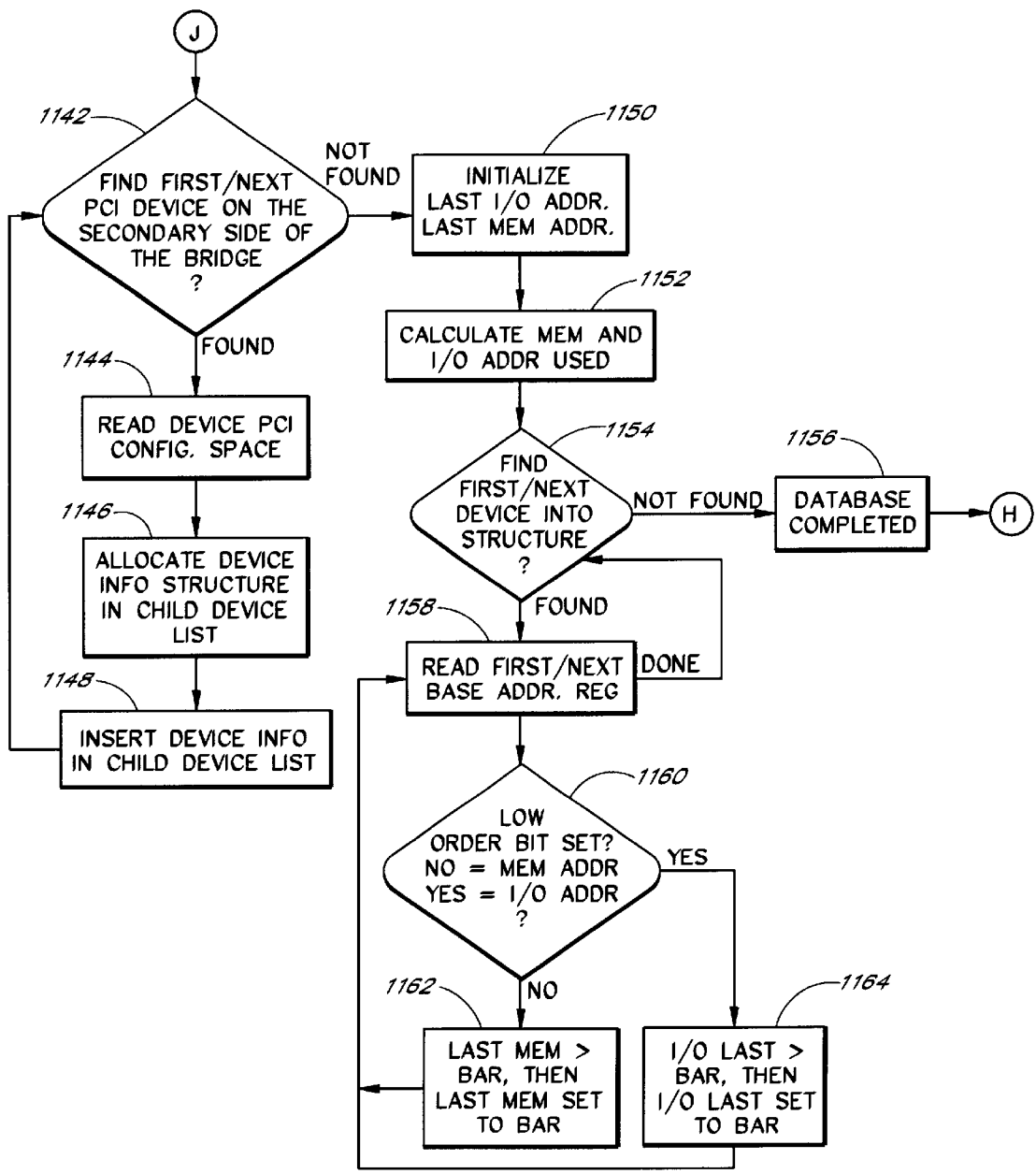

FIGS. 11A and 11B depict flowcharts which illustrate one inventive method for creating the PCI configuration space data structure shown in FIG. 10. FIGS. 11A and 11B represent the states which may be accomplished by the configuration manager 500 (FIG. 6) operating within the computer system 100.

As indicated by state 1110, the process indicated and represented by FIGS. 11A and 11B is carried out for one or more buses on the computer system. At state 1112, space in the memory of the computer system 100 (FIG. 1) is allocated for the memory structure. This allocation can be performed at the time of compiling or dynamically.

Next, at state 1114 the predefined start and end memory addresses for the PCI bus are written to the array element 1004 (FIG. 10) representing that PCI bus. The start and end memory addresses may be the same as those used when the system is initialized by the BIOS program during system boot-up.

Then, at state 1116 the predefined start and end input/output ("I/O") addresses and the interrupt assignment (ISA IRQ) for the bus are written in the appropriate locations in the array element representing the PCI bus. As with the start and end memory addresses, the start and end I/O addresses and the interrupt assignment may also be the same as those used by the BIOS program when the system was initialized.

As represented by states 1118, 1120, 1121, 1122, 1123 and 1124, a repeated process or loop is next performed where each device number from 0 to 31 and function number from 0 to 7 is reviewed sequentially to determine whether such a device exists on the current bus and whether that device supports more than one function as defined by the PCI standard. At the first part of that loop, at state 1118, a standard PCI configuration access (query) is performed, which determines whether, for example, device 0, is present on the bus. If a device is located with that device number, the process continues to state 1120 wherein the PCI configuration space information of that device is then read from that device including whether any other function numbers (0–7) are supported by the device.

Next, at state 1121 memory space is allocated for the device information structure for the device and the PCI configuration information read from the device is then copied into the allocated device information structure. At state 1122 that device information structure is linked into the list either by inserting a pointer into the corresponding bus information structure if this is the first device, or inserting the pointer into the next device location of the previous device information structure in the device information list for this bus.

Continuing to a state 1123, the configuration manager 500 checks whether the device provides a bridge to a second bus. If the device has a bridge, the configuration manager 500 allocates configuration space data structures for the adapters on the secondary side of the bridge at decision state 1142. However, if no bridge is found, the configuration manager 500 sets the child device list to NULL (state 1124). The process then returns to state 1118 where the system may attempt to locate the next PCI device on the bus. This process or loop may be repeated for each device on the PCI bus. In this manner, a device information list of PCI devices with each element in the list containing configuration information is created in the form depicted in FIG. 10.

Referring now to the state 1142, the configuration manager 500 having determined that the device has a bridge, the configuration manager 500 attempts to allocate configuration space date structures for the adapters on the secondary side of the bridge. As represented by states 1142, 1144, 1146 and 1148, a repeated process or loop is next performed where each device number from 0 to 31 and function number from 0 to 7 is reviewed sequentially on the secondary side of the bridge to determine whether such a device exists on the secondary side and whether that device supports more than one function. At the first part of that loop, at decision state 1142, a standard PCI configuration access (query) is performed, which determines whether, for example, device 0, is present on the secondary side. If a device is located with that device number, the process continues to state 1144 wherein the PCI configuration space information of that device is then read from that device including whether any other function numbers (0–7) are supported by the device.

Next, at state 1146 memory space is allocated for the device information structure for that device and the PCI configuration information read from the device is then copied into the allocated device information structure. At state 1148 that device information structure is linked into the child device list 1032 (FIG. 10) either by inserting a pointer into the child device list 1032 if this is the first device, or inserting the pointer into the next device location of the previous device information structure in the child device list 1032.

The process then returns to decision state 1142 where the system may attempt to locate the next PCI device on the secondary side of the bridge. This process or loop may be repeated for each device on the secondary side of the bridge. In this manner, a child device list 1032 of PCI devices with each element in the list containing configuration information is created in the form depicted in FIG. 10.

After the last PCI device on the bus has been added to the child device list, the process proceeds to state 1150. In this state, the last I/O address 1060 in the device information structure 1008 (see FIG. 10) and the last memory address 1054 in the PCI bus information structure are set, respectively, to the memory end 1052 and the I/O end 1058 addresses.

Next, in state 1152, the amount of memory and I/O address space used by all of the PCI devices on the secondary bus may be determined. In one embodiment, the amount of memory and I/O address space used is determined by tracking the last memory and I/O address space assigned. The process for making those determinations is performed in states 1154 through 1164. Generally speaking, the process for determining the amount of memory an I/O address used by the PCI devices on the secondary bus includes looking at each of the base address registers on each of the devices on the secondary bus and determining the lowest base address register value for an I/O and the lowest base address register value for memory.

Specifically, at state 1154, the process locates the first device information structure on the bus by scanning the device information list 1030 attached to the device information structure or, if the first device information structure has already been processed, the process looks for the next device information structure. If no device information structure is found, the process is complete.

When a device information structure is located at state 1154, the data in the device information structure representing the first base address register is read (state 1158). If the first base address register has already been read, the process attempts to read the next base address register. If no further base address registers exist, the process then returns to state 1154.

When a base register is found and read in state 1158, the process proceeds to the state represented by state 1160. Under the PCI configuration standard, if the low order bit of a base address register is set, then that base register represents an I/O address and the process then proceeds to state

1164. In state 1164, the base address register contents are masked with the hexadecimal number 0xFFFFFFFE (per the PCI specification) and a comparison is made between that value and the last I/O address in the device information structure. If that masked value is a lower value, it is then written to the last I/O address in the bus information structure. The process then returns to state 1158.

However, if the low order bit in the base address register is not set, then the base address register represents a memory address and the process proceeds to state 1162. In state 1162, the contents of the base address register are masked with the hexadecimal number 0xFFFFFFF0 (per the PCI specification) and then compared with the contents of the last memory address in the device information structure. If that masked value is a lower value, it is then written to the last memory address in the bus information structure. The process then returns to state 1158.

As represented by state 1158, this process is repeated for each of the base registers located on a device. After the last base address register has been analyzed according to states 1160, 1162, 1164, the process returns to state 1154 and the foregoing process is repeated for each device on the bus. This process thereby determines the lowest address for both I/O and memory used by the devices on the secondary bus. The process proceeds in this manner because memory for the devices is allocated from the highest address to the lowest. After this has been completed, the PCI configuration initialization process for the IOP is completed (state 1156). The configuration manager 500 then proceeds to decision state 1118 (FIG. 11A) to look for other devices on the primary bus.

After the last PCI device on the primary bus has been added to the device information list, the process proceeds to state 1126. In this state, the last I/O address in the PCI bus information structure 1022 (see FIG. 4) and the last memory address 1020 in the PCI bus information structure are set, respectively, to the memory end 1012 and the I/O end 1016 addresses.

Next, in state 1128, the amount of memory and I/O address space used by all of the PCI devices on the bus may be determined. In one embodiment, the amount of memory and I/O address space used is determined by tracking the last memory and I/O address space assigned. The process for making those determinations is performed in states 1130 through 1140. Generally speaking, the process for determining the amount of memory an I/O address used by the PCI devices on the bus includes reading each of the base address registers on each of the devices on the bus and determining the lowest base address register value for an I/O and the lowest base address register value for memory.

Specifically, at state 1130, the process locates the first device information structure on the bus by scanning the device information list attached to the bus information structure or, if the first device information structure has already been processed, the process looks for the next device information structure. If no device information structure is found, the process is complete.

When a device information structure is located at state 1130, the data in the device information structure representing the first base address register is read (state 1134). If the first base address register has already been read, the process attempts to read the next base address register. If no further base address registers exist, the process then returns to state 1130.

When a base register (not shown) is found and read in state 1134, the process proceeds to the state represented by state 1136. Under the PCI configuration standard, if the low order bit of a base address register is set, then that base register represents an I/O address and the process then proceeds to state 1140. In state 1140, the base address register contents are masked with the hexadecimal number 0xFFFFFFFE (per the PCI specification) and a comparison is made between that value and the last I/O address in the bus information structure. If that masked value is a lower value, it is then written to the last I/O address in the bus information structure. The process then returns to state 1134.

However, if the low order bit in the base address register is not set, then the base address register represents a memory address and the process proceeds to state 1138. In state 1138, the contents of the base address register are masked with the hexadecimal number 0xFFFFFFF0 (per the PCI specification) and then compared with the contents of the last memory address in the bus information structure. If that masked value is a lower value, it is then written to the last memory address in the bus information structure. The process then returns to state 1134.

As represented by state 1134, this process is repeated for each of the base registers located on a device. After the last base address register has been analyzed according to states 1136, 1138, 1140, the process returns to state 1130 and the foregoing process is repeated for each device on the bus. This process thereby determines the lowest address for both I/O and memory used by the devices on the bus. The process proceeds in this manner because memory for the devices is allocated from the highest address to the lowest. After this has been completed, the PCI configuration initialization process is completed.

Figure 12:
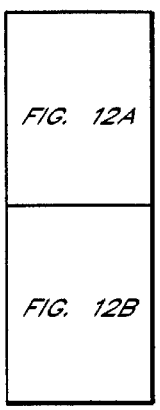
FIGS. 12A and 12B are a flowchart depicting the process followed in one embodiment of the invention relating to the hot add of an adapter or IOP in a computer system such as shown in FIG. 1.
Figure 12A:
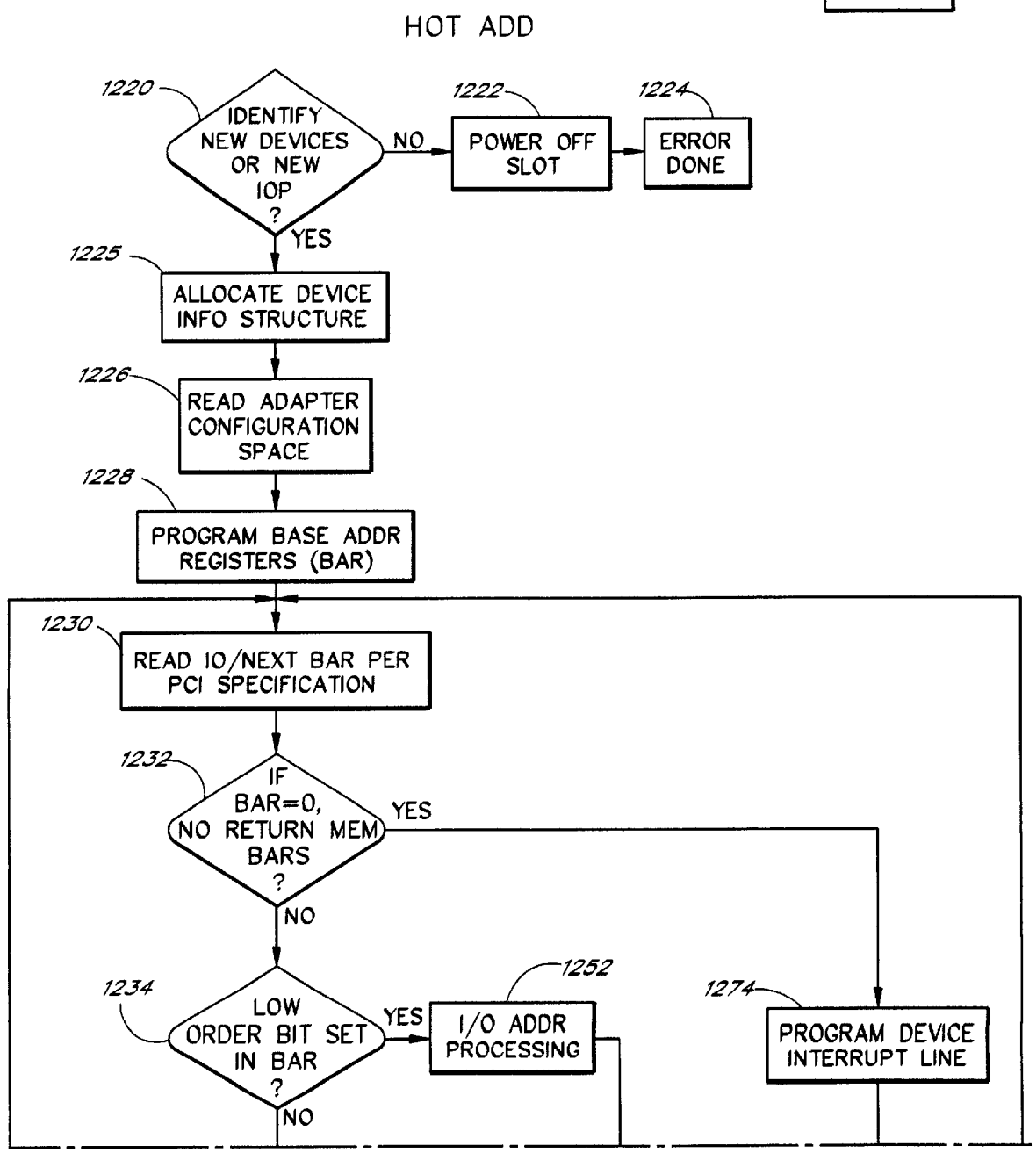
Figure 12B:
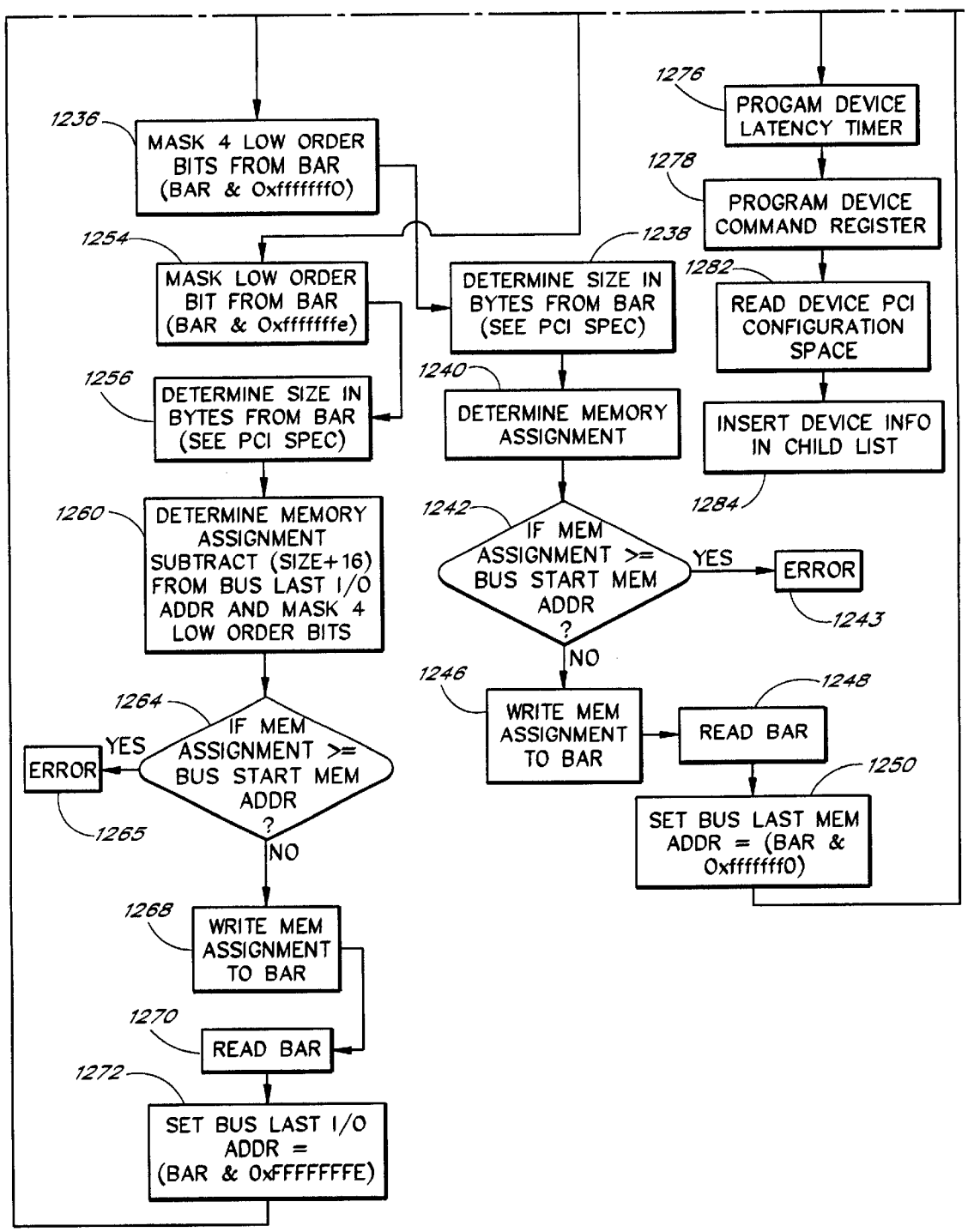

Referring now to FIGS. 12A and 12B, the process for programming the configuration space of a device during a hot addition will be described. The device may consist of an IOP or an adapter which is controlled by an IOP. FIGS. 12A and 12B describe in greater detail the state 604 of FIG. 7 and states 712 and 714 of FIG. 8. The flowcharts represent the states which may be accomplished by the configuration manager 500 operating within the computer system.

In general, the process for performing a hot add is similar to the states that occur with regard to each device on a bus during system initialization associated with boot-up. However, generally speaking, the process differs in that rather than initializing every device in the system, the capability exists to initialize any device because configuration information is available and maintained in the PCI configuration space by the configuration manager 500.

First, at state 1220, a system query is sent to attempt to locate or read the newly added IOP or adapter. If the IOP or adapter cannot be read by the system, the process continues to state 1222, wherein the power to that slot is turned off. Next, at state 1224, an error message is generated and the process ends.

However, if the device is located in response to the system query, the process proceeds to state 1225, wherein, memory space is allocated for what will be the device information structure for the newly added device. Since a hotly added IOP may have multiple embedded adapters, the configuration manager 500 must configure each of the adapters on the IOP. Thus, the states 1225–1272 are followed for each adapter on the IOP. However, the following description will, for the sake of simplicity, describe the configuration process for a single adapter.

Next, at state 1226, the configuration information that is stored on the adapter is read. Typically, this information includes the vendor identification, and the amounts and types of memory required by the device. At state 1228 that information is written to the memory location allocated in state 1225.

Next, as represented generally by state 1228, the base address registers of the adapter are programmed. Specifically, at state 1230, the first base address register is read in accordance with the PCI specification. This may be accomplished by writing 0xFFFFFFFF to the base address register and then reading the base address register. Next, at state 1232, if no base address registers remain (i.e., if all of the base address registers have already been read), the configuration manager 500 continues on to the sequence of states starting at state 1274. However, when the base address register is being read, the process continues to state 1234.

At state 1234, if the low order bit of the base register is set (equals 1) then that base address register represents an I/O address and the process continues to the series of states beginning with state 1252 and continuing on FIG. 12B which are described below. Alternatively, if the lower order bit is not set, the base address register is a memory base address register and the system proceeds to state 1236.

At state 1236, the four low order bits from the base address register are masked as a preliminary step to determining the size of the memory required by the base address register. The determination of the amount of memory required by the base address register is commonly known to those of ordinary skill in the art as part of the standards of the PCI bus architecture and is therefore only outlined here.

Next, at state 1238, the amount of memory required by the base address register is determined. Then, at state 1240 the memory assignment for the base address register is determined with reference to the last memory address 1020 in the bus information structure.

Next, as represented by state 1242, after the memory assignment for the base address register is determined, the memory assignment is compared to the memory start address 1010 stored in the PCI bus information structure for that bus to ensure that the memory being assigned to that base address register is within the range allocated for devices on that bus. If an error is encountered, the configuration managers ends at a state 1243. Otherwise, if the memory is allocated within a valid range, in states 1246, 1248 and 1250, the proper value is written to the base address register according to the sequence of states defined by the PCI specification.

Specifically, in state 1246, the memory assignment for the base address register is written to the base address register. Then, at state 1248, the base address register is read and at state 1250, that value is used to set the last memory address 1020 (see FIG. 10) in the PCI bus information structure. As those of ordinary skill will recognize, reads to and writes from the base address register sometimes involve masking of selected bits as specified by the PCI bus standard. After state 1250 has been completed, the process returns to state 1230.

If the base address register had the lower order bit set at decision state 1234, indicating that the base address register was for I/O, not memory, the process proceeds to the state 1252 to start I/O address processing.

At state 1254 in FIG. 12B, the number stored in the base address register is read and the low order bit is masked. Next, at state 1256, from that information the amount of I/O required by the base address register is determined according to the PCI specification, as is apparent to those of ordinary skill in the art.

Next, at state 1260, the I/O assignment for the base address register is determined by using the last I/O address 1022 (see FIG. 10) stored in the PCI bus information structure and the amount of I/O required by the base address register. Next, at state 1264, a comparison is made to ensure that the I/O assignment given to the base address register does not fall outside the range of I/O allocated to devices on this bus. If it does, the process cannot be completed and the process flow ends at a state 1265.

If sufficient resources are available, at state 1268 according to the PCI specification, the I/O assignment for the base address register is written to the base address register. First, at state 1268, the memory assignment is written to the base address register. Then, at state 1270, the base address register is read. Next, at state 1272, the information read from the base address register is used to set the last I/O 1022 in the PCI bus information structure (see FIG. 10).

After the base address register has been programmed, the process returns to state 1230 to read the next base address register. At state 1232, if no further base address registers are present, the configuration manager 500 next executes states 1274 through 1284 to complete the programming of the adapter or IOP.

First, at state 1274, the device interrupt line is programmed with the proper ISA IRQ corresponding to the bus number. This information is stored as part of the PCI bus information structure. Next, at state 1276, a device latency timer is programmed with a predefined value and at state 1278, a device command register is also programmed with a predefined value.

Then, at state 1282, the device PCI configuration information is read from the device and then written into the device information structure. Finally, at state 1284, the created device information structure is inserted into the device information list associated with the bus which completes the process.

Figure 13:
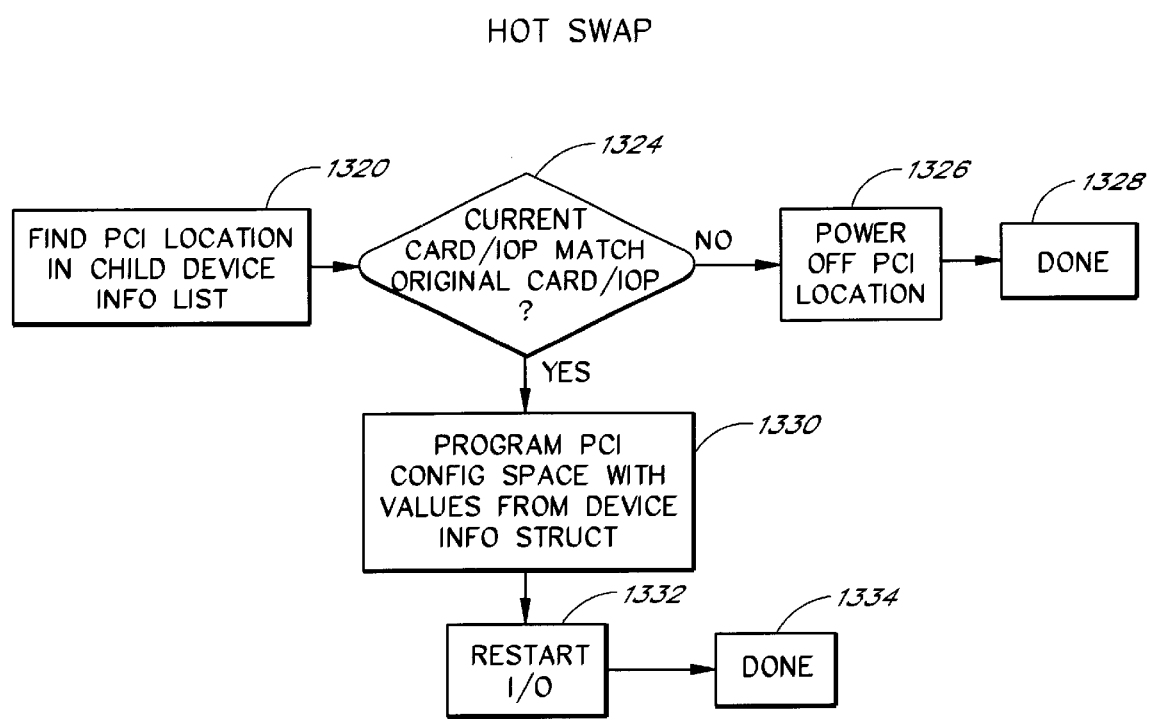
FIG. 13 is a flowchart depicting the process followed in one embodiment of the invention relating to hot swap of an adapter or IOP in a computer system such as is shown in FIG. 1.

Turning now to FIG. 13, the aspects of the configuration space relating to its use in connection with the hot swap of an IOP or an adapter controlled by an IOP will be described. FIG. 13 represents the states which are accomplished by the configuration manager 500 (FIG. 6) operating within the computer system. The following description explains in further detail the process that occurs in state 814 of FIG. 9.

Starting at a state 1320, a new IOP or adapter which is controlled by an IOP has been added to the computer system 100. The power to the computer has been turned on. The configuration manager 500 will now attempt to reconfigure the new device according to the same configuration as the old device. Further, if an IOP having multiple adapters has been added, the following process flow will have to be followed for each adapter on the IOP. Now, at state 1320, the replacement card in the slot is queried to return the vendor identification and the device identification of the card installed in the slot using standard PCI configuration access known to those of ordinary skill in the art.

The location of this card on the bus is located in the bus device information structure 1004 (see FIG. 10). This is accomplished by locating the array element corresponding to the bus and then traversing the device information list linked to that array element until the PCI location (typically identified by bus number, device number and function number) corresponding to the current location of interest is located. Then, at state 1324 the vendor identification and device identification which was read from the replacement card is compared to the vendor ID and device ID in the device information structure corresponding to the slot of interest. If those values are not the same, an improper swap has been attempted in that the replacement card is not identical to the card previously located in the slot. The system then proceeds to state 1326 wherein power to that slot is turned off. The process then proceeds to state 1328 wherein an error message is generated and the process terminates.

However, if the vendor identification and the device identification of the card currently located in the slot of interest and the vendor ID and device ID in the device information structure corresponding to that slot are identical, the process proceeds to state 1330. At state 1330, the PCI configuration space information stored in the device information structure is written to the replacement device. Then, at state 1332, I/O to the slot is restarted. At that point, as represented by state 1334, the hot swap is completed.

The invention may be embodied in other specific forms and arrangements without departing from its spirit or essential characteristics. For example, the information required to initialize a device being hot added can be maintained in a template. The template may be based upon the configuration information of an adapter of the same type located on a reference system. After following the traditional initialization process of configuring the reference system which includes some or all the devices on some or all the buses, the configuration information for each bus and each device in each bus slot is stored in memory. That information is used to build a template which is then used to supply the configuration information when a device is hot added. However, such a system requires that devices which are hot added can only be the identical type and in the same location as in the reference system. Additionally, the memory structure can be in forms other than an array with device information lists, such as a table.

While the above detailed description has shown, described, and pointed out the fundamental novel features of the invention as applied to various embodiments, it will be understood that various omissions and substitutions and changes in the form and details of the system illustrated can be made by those skilled in the art, without departing from the intent of the invention. The scope of the invention is indicated by the appended claims rather than by the foregoing description. All changes which come within the meaning and range of equivalency of the claims are to be embraced within their scope.

What is claimed is:

1. A computer system capable of hot adding an adapter on an expansion bus input/output platform, comprising:
   an operational computer, including a memory, executing an operating system module;
   a plurality of I/O devices;
   an input/output platform having an expansion bus and a device driver module, wherein the input/output platform is connected to the computer;
   a plurality of adapters connected to the expansion bus of the input/output platform, wherein each adapter controls the I/O to selected ones of the I/O devices, wherein the device driver module of the input/output platform controls communications between the plurality of adapters and the operating system module; and
   a configuration manager, executed on the computer, capable of programming a hot added adapter on the input/output platform so that the hot added adapter can communicate with the computer.

2. The computer system as defined in claim 1, wherein the hot added adapter is connected to the expansion bus by an industry standard bus.

3. The computer system as defined in claim 1, wherein the hot added adapter is connected to the expansion bus by a PCI bus.

4. The computer system as defined in claim 1, wherein the hot added adapter is connected to the expansion bus by an ISA bus.

5. The computer system as defined in claim 1, wherein the hot added adapter is connected to the expansion bus by an EISA bus.

6. The computer system as defined in claim 1, wherein at least one of the plurality of adapters controls a mass storage device.

7. The computer system as defined in claim 1, wherein the computer sparsely allocates system resources to the plurality of adapters upon power-up.

8. A computer system capable of hot adding an input/output platform having at least one embedded adapter, comprising:
   a powered-up computer executing an operating system module;
   a hot added input/output platform having at least one embedded adapter and a device driver module, wherein the hot added input/output platform is connected to the powered-up computer, wherein the device driver module controls communications between the adapter and the operating system module; and
   a configuration manager, executed on the computer, capable of programming the hot added input/output platform so that the at least one adapter on the hot added input/output platform can communicate with the powered-up computer.

9. The computer system as defined in claim 8, further comprising a user interface, executed on the computer, which accepts requests for a hot add of the input/output platform and communicates the requests to the configuration manager.

10. The computer system as defined in claim 8, wherein the hot added input/output platform is connected to the computer by an industry standard bus.

11. The computer system as defined in claim 8, wherein the hot added input/output platform is connected to the computer by a PCI bus.

12. The computer system as defined in claim 8, further comprising a plurality of adapters, the plurality of adapters each having a sparsely allocated range of memory addresses.

13. A computer system capable of hot swapping an adapter which is controlled by an input/output platform, comprising:
   a computer, including a memory, executing an operating system module;
   an input/output platform having at least one embedded adapter and a device driver module, wherein the device driver module controls communications between the adapter and the operating system module; and
   a configuration manager, executed on the computer, capable of suspending the communications to the input/output platform, and storing the configuration information of the input/output platform in the memory of the computer.

14. The computer system as defined in claim 13, wherein the input/output platform including the embedded adapter is connected to the expansion bus by an industry standard bus.

15. The computer system as defined in claim 13, wherein the input/output platform including the embedded adapter is connected to the computer by a PCI bus.

16. The computer system as defined in claim 13, wherein the input/output platform including the embedded adapter is connected to the computer by an ISA bus.

17. The computer system as defined in claim 13, wherein the input/output platform including the embedded adapter is connected to the computer by an EISA bus.

18. The computer system as defined in claim 13, wherein the input/output platform controls a mass storage device.

19. The computer system as defined in claim 13, further comprising a hot plug circuit which enables power to a hot swapped input/output platform having embedded adapters.

20. The computer system as defined in claim 13, further comprising a user interface which accepts requests for a hot swap of an input/output platform and communicates the requests to the communication manager.

21. A computer system capable of hot swapping an adapter on an expansion bus input/output platform, comprising:

a computer, including a memory, executing an operating system module;

an input/output platform having an expansion bus and a device driver module, wherein the input/output platform is connected to the computer;

an adapter, which is connected to the expansion bus of the input/output platform, wherein the device driver module controls communications between the adapter and the operating system module; and a configuration manager, executed on the computer, capable of suspending the communications to the adapter, and storing the configuration information of the adapter in the memory of the computer.

22. The computer system as defined in claim 21, wherein the new adapter is connected to the expansion bus by an industry standard bus.

23. The computer system as defined in claim 21, wherein the adapter is connected to the computer by a PCI bus.

24. The computer system as defined in claim 21, wherein the adapter is connected to the computer by an ISA bus.

25. The computer system as defined in claim 21, wherein the adapter is connected to the computer by an EISA bus.

26. The computer system as defined in claim 21, wherein the adapter controls to SCSI devices.

27. The computer system as defined in claim 21, wherein the adapter controls a mass storage device.

28. The computer system as defined in claim 21, wherein the computer includes a hot plug hardware which enables power to the hot swapped input/output platform.

29. A computer system for hot adding an input/output compliant device, comprising:

means for executing an operating system module on the computer system;

means for providing a configuration data space for a plurality of devices;

means for programming a plurality of configuration registers of a hot added input/output compliant device, wherein the hot added input/output compliant device is connected to at least one adapter, and wherein the hot added input/output compliant device includes a device driver module that controls communications between the adapter and the operating system module; and means for updating the configuration data space to include configuration information of the hot added input/output compliant device.

30. The computer system of claim 29, wherein the means for programming the hot added input/output compliant device includes means for reading configuration information of the hot added input/output compliant device.

31. The computer system of claim 30, wherein the configuration information includes a vendor identification and the amount and type of memory required by the hot added input/output compliant device.

32. The computer system of claim 31, further comprising means for activating power to the hot added input/output compliant device.

33. A computer system capable of hot swapping an adapter on an expansion bus of an input/output platform, comprising:

a computer including a memory, wherein the computer sparsely allocates system resources upon boot-up;

an input/output platform having at least one embedded adapter;

a device driver module, which is operating on the input/output platform;

an operating system having an operating system module, which is in communication with the device driver module, wherein the device driver module controls communications between the adapter and the operating system module; and a configuration manager, executed on the computer, capable of suspending the communications between the operating system module and the device driver module, and storing the configuration information of the at least one embedded adapter in the memory of the computer.

34. A computer system for hot adding an input/output platform compliant device, comprising:

a powered-up computer including an industry standard bus having a plurality of slots, each of the plurality of slots configured to receive an input/output platform compliant device;

an input/output platform compliant device, wherein the input/output platform compliant device includes at least one adapter;

an operating system having an operating system module;

a device driver module, executing on the input/output platform, for controlling communications between the adapter and the operating system module; and a configuration manager, executed by the computer, capable of programming the input/output platform compliant device which is hot added to the powered-up computer.

* * * * *

UNITED STATES PATENT AND TRADEMARK OFFICE
CERTIFICATE OF CORRECTION

PATENT NO. : 6,223,234 B1
DATED : April 24, 2001
INVENTOR(S) : Mahalingam

It is certified that error appears in the above-identified patent and that said Letters Patent is hereby corrected as shown below:

Column 11,
Line 53, please delete "1OPS" and insert therefor -- IOP's --.

Column 23,
Line 37, please remove the words "controls to SCSI" and replace therefor -- controls I/O to SCSI --.

Signed and Sealed this

Eighth Day of April, 2003

JAMES E. ROGAN
*Director of the United States Patent and Trademark Office*